US010715687B2

(12) United States Patent
Hayashi et al.

(10) Patent No.: US 10,715,687 B2
(45) Date of Patent: Jul. 14, 2020

(54) INFORMATION PROCESSING SYSTEM, INFORMATION PROCESSING APPARATUS, AND INFORMATION PROCESSING METHOD FOR TESTING A SERIES OF PROCESSES OF ONE OR MORE APPLICATIONS

(71) Applicants: Yuuichiroh Hayashi, Kanagawa (JP); Kai Kodama, Kanagawa (JP); Masaki Arai, Tokyo (JP)

(72) Inventors: Yuuichiroh Hayashi, Kanagawa (JP); Kai Kodama, Kanagawa (JP); Masaki Arai, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 15/989,954

(22) Filed: May 25, 2018

(65) Prior Publication Data

US 2018/0343352 A1 Nov. 29, 2018

(30) Foreign Application Priority Data

May 29, 2017 (JP) ................................ 2017-105902
Sep. 25, 2017 (JP) ................................ 2017-184189

(51) Int. Cl.
*G06F 3/12* (2006.01)
*H04N 1/00* (2006.01)
(Continued)

(52) U.S. Cl.
CPC ....... *H04N 1/00344* (2013.01); *G06F 3/1203* (2013.01); *G06F 9/44505* (2013.01);
(Continued)

(58) Field of Classification Search
CPC .......... H04N 1/00949; H04N 1/00941; H04N 1/32133; H04N 1/32769; H04N 2201/3208
See application file for complete search history.

(56) References Cited

U.S. PATENT DOCUMENTS

| | | | | |
|---|---|---|---|---|
| 10,367,962 | B2 * | 7/2019 | Hayashi | H04N 1/00949 |
| 2009/0235344 | A1 | 9/2009 | Ohzaki et al. | |

(Continued)

FOREIGN PATENT DOCUMENTS

| | | |
|---|---|---|
| JP | 2017-033218 | 2/2017 |

OTHER PUBLICATIONS

Extended European Search Report dated Oct. 26, 2018 in Patent Application No. 18174228.9, 8 pages.

*Primary Examiner* — Juan M Guillermety
(74) *Attorney, Agent, or Firm* — Oblon, McClelland, Maier & Neustadt, L.L.P.

(57) ABSTRACT

An information processing system includes one or more information processing apparatuses each of which performs a plurality of programs to implement functions. The system includes a memory to store application information associating flow information and application configuration information for each of one or more applications that performs, when executed, a series of processes using electronic data, and circuitry to receive a request including the application configuration information, generate one or more test cases for testing the series of processes based on parameter information defined in the application configuration information in the request, acquires flow information identified with flow identification defined in the application configuration information in the request and executes, according to an order of executing one or more programs defined in the flow information, the one or more programs each of which
(Continued)

is identified with program identification defined in the flow information acquired, to test the series of processes.

11 Claims, 29 Drawing Sheets

(51) Int. Cl.
*G06F 11/36* (2006.01)
*G06F 9/445* (2018.01)
*G06Q 10/06* (2012.01)

(52) U.S. Cl.
CPC ...... *G06F 11/3672* (2013.01); *G06F 11/3688* (2013.01); *G06F 11/3692* (2013.01); *G06Q 10/06* (2013.01); *H04N 2201/0094* (2013.01)

(56) References Cited

U.S. PATENT DOCUMENTS

| | | | | |
|---|---|---|---|---|
| 2011/0088014 | A1 | 4/2011 | Becker et al. | |
| 2012/0151448 | A1 | 6/2012 | Becker et al. | |
| 2012/0260234 | A1 | 10/2012 | Jivane et al. | |
| 2013/0031533 | A1* | 1/2013 | Machida | G06F 11/3692 717/127 |
| 2013/0191814 | A1* | 7/2013 | Fujii | G06F 11/3684 717/124 |
| 2013/0307774 | A1 | 11/2013 | Hayashi et al. | |
| 2014/0019499 | A1 | 1/2014 | Arai | |
| 2014/0223150 | A1 | 8/2014 | Honda et al. | |
| 2014/0280401 | A1 | 9/2014 | Arai | |
| 2015/0077799 | A1 | 3/2015 | Arai | |
| 2015/0156340 | A1 | 6/2015 | Yamano et al. | |
| 2016/0117340 | A1 | 4/2016 | Hayashi | |
| 2016/0163013 | A1 | 6/2016 | Arai | |
| 2016/0259933 | A1 | 9/2016 | Sugimura et al. | |
| 2016/0266977 | A1* | 9/2016 | Hayashi | G06F 11/1402 |
| 2016/0274945 | A1* | 9/2016 | Namihira | G06F 3/1203 |
| 2017/0083697 | A1 | 3/2017 | Hayashi et al. | |
| 2017/0109194 | A1 | 4/2017 | Namihira et al. | |
| 2017/0139811 | A1* | 5/2017 | Kuo | G06F 11/3684 |
| 2017/0255486 | A1 | 9/2017 | Zhang et al. | |
| 2017/0255495 | A1 | 9/2017 | Sakanashi et al. | |
| 2017/0331969 | A1 | 11/2017 | Ogawa et al. | |
| 2017/0346981 | A1 | 11/2017 | Hayashi | |
| 2018/0013913 | A1 | 1/2018 | Hayashi et al. | |
| 2018/0060131 | A1 | 3/2018 | Namihira et al. | |
| 2018/0121646 | A1 | 5/2018 | Sakanashi et al. | |
| 2018/0343352 | A1* | 11/2018 | Hayashi | G06F 11/3692 |

* cited by examiner

| DATA TYPE BEFORE CONVERSION | DATA TYPE AFTER CONVERSION | TYPE CONVERSION TO BE GENERATED |
|---|---|---|
| InputStream | LocalFilePath | FIRST TYPE CONVERSION |
| LocalFilePath | File | SECOND TYPE CONVERSION |
| ... | ... | ... |

```
"flowName" : "ocr-divide" , }1101
"flowDetails" : [                                   1102
{                                                   1110
    "detailName" : "detail0" ,
    "componetName" : "OCR" ,
    "operationName": "process" ,
    "parameters" : {
        "outputSize" : "A4" ,
        ...
    }
},
{                                                   1120
    "detailName" : "detail1" ,
    "componetName" : "PDF" ,
    "operationName" : "divideByPageNumbers" ,
    "parameters" : {
            ...
    }
}
]
```

Register Application — G300

| Select Type | Basic Setup | Detailed Setup | Register |

Please Input Basic Information on Application.

Type: Scan Workflow

Application Name: OCR Division Application — G310 ▶ G320

Design Plate: Single Screen

Authentication: None ▶ G330

Language(s): English,Japanese ▶ G340
- ✓ English
- ✓ Japanese
- ☐ Chinese

[Return] [Register] [Next — G350] [Cancel]

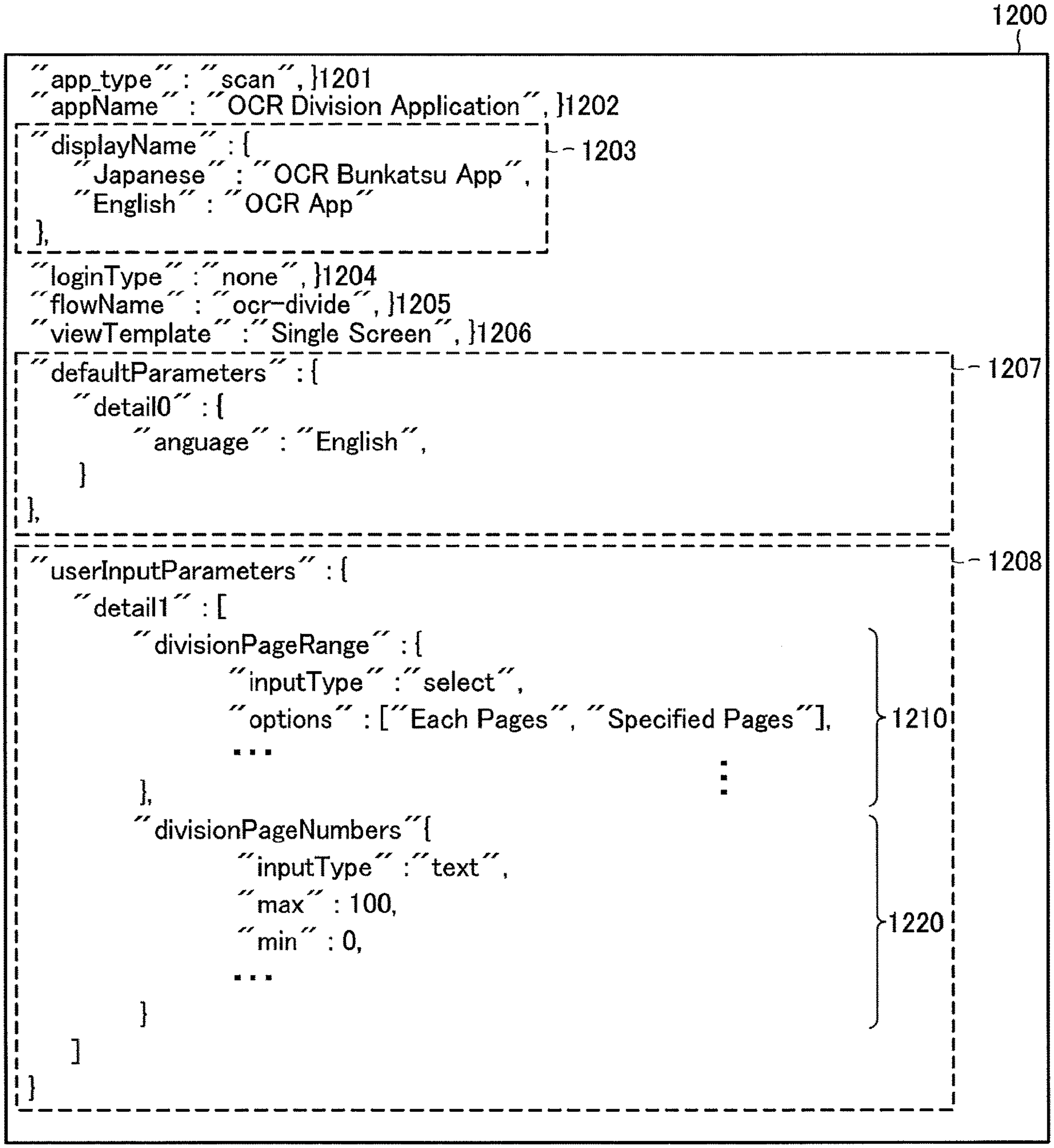

FIG. 15

```
"app_type" : "scan", }1201
"appName" : "OCR Division Application", }1202
"displayName" : {                                    ⌐- 1203
    "Japanese" : "OCR Bunkatsu App",
    "English" : "OCR App"
},
"loginType" : "none", }1204
"flowName" : "ocr-divide", }1205
"viewTemplate" : "Single Screen", }1206
"defaultParameters" : {                              ⌐- 1207
    "detail0" : {
        "anguage" : "English",
    }
},
"userInputParameters" : {                            ⌐- 1208
    "detail1" : [
        "divisionPageRange" : {
            "inputType" : "select",
            "options" : ["Each Pages", "Specified Pages"],  ⎫
            ...                                              ⎬ 1210
        },                                                   ⎭
        "divisionPageNumbers"{
            "inputType" : "text",
            "max" : 100,                                     ⎫
            "min" : 0,                                       ⎬ 1220
            ...                                              ⎭
        }
    ]
}
```

1200

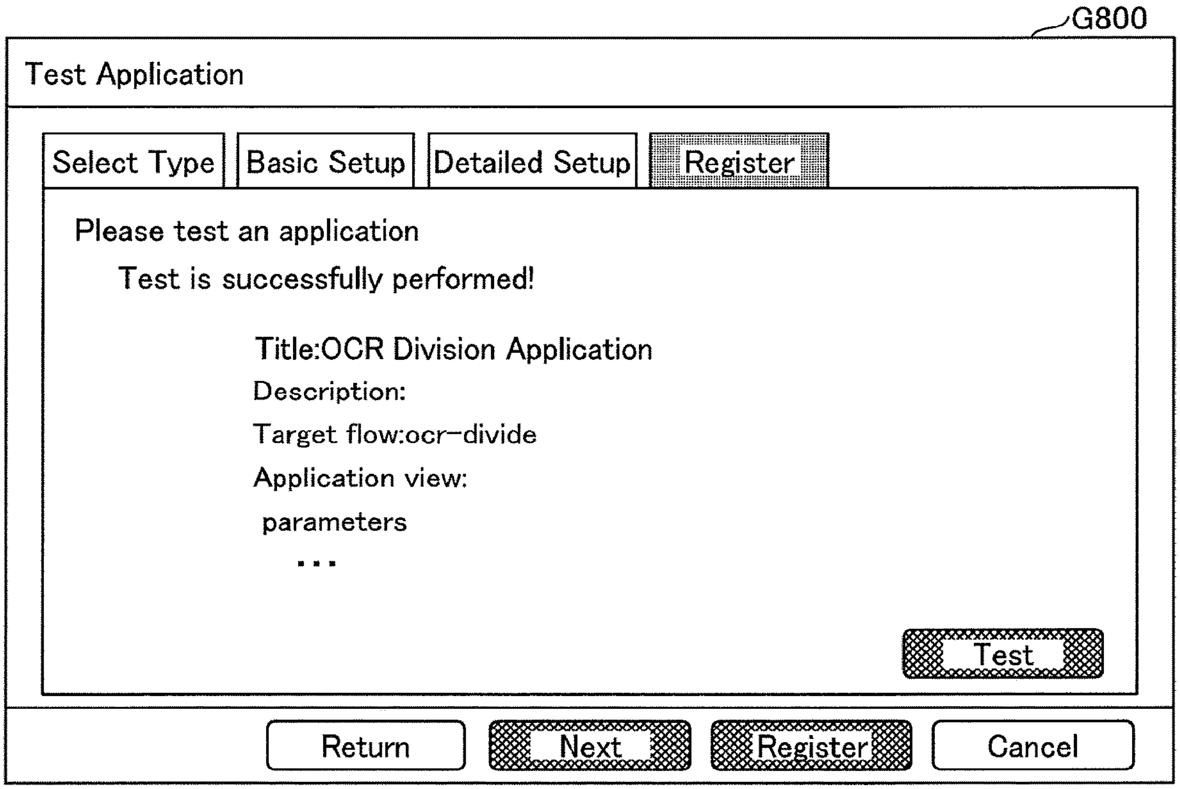

FIG. 17A

Test Application — G800

| Select Type | Basic Setup | Detailed Setup | Register |

Please test an application
   Test is successfully performed!

Title:OCR Division Application
      Description:
      Target flow:ocr-divide
      Application view:
      parameters
        ...

[Test]

[Return] [Next] [Register] [Cancel]

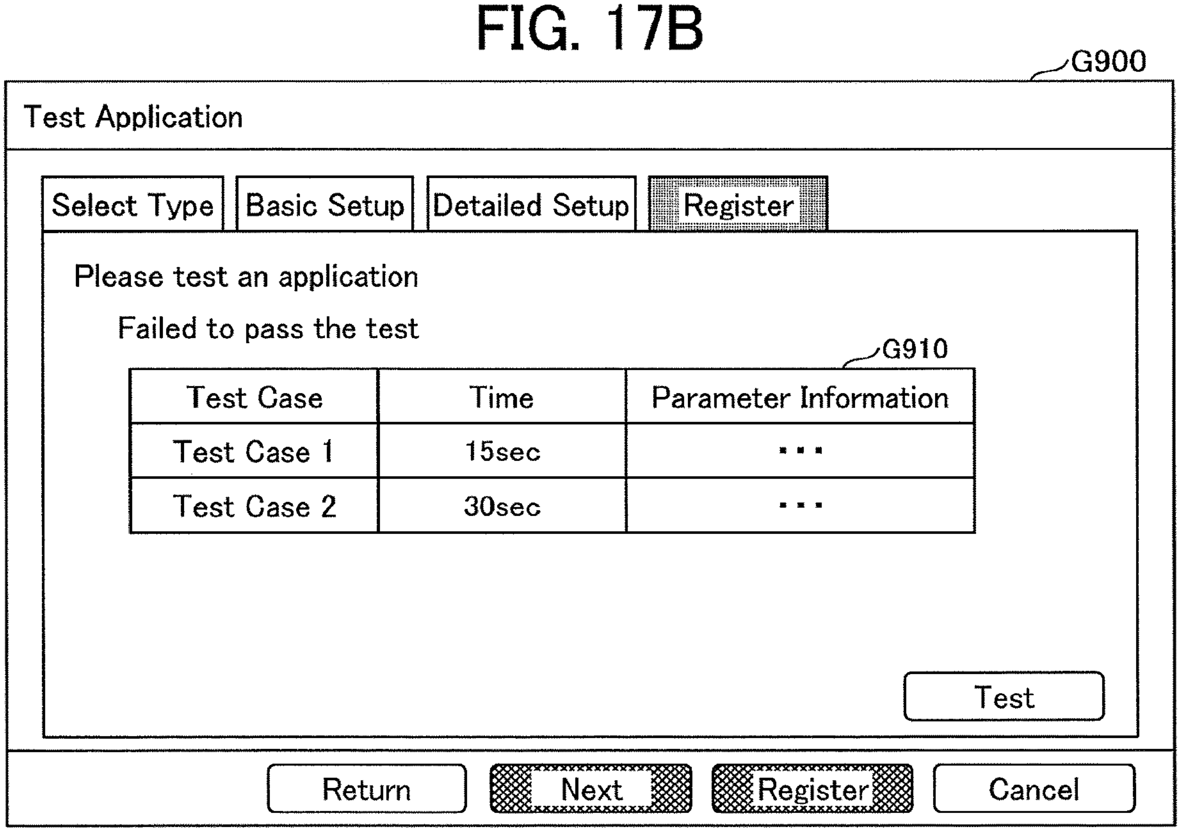

FIG. 17B

Test Application — G900

| Select Type | Basic Setup | Detailed Setup | Register |

Please test an application
   Failed to pass the test

G910

| Test Case | Time | Parameter Information |
|---|---|---|
| Test Case 1 | 15sec | ... |
| Test Case 2 | 30sec | ... |

[Test]

[Return] [Next] [Register] [Cancel]

FIG. 19A

TEST CASE1:

```
″language″ : ″English″,
″ divisionPageRange″ : ″Each Pages″,
″divisionPageNumbers″ : 0
```

FIG. 19B

TEST CASE2:

```
″language″ : ″English″,
″divisionPageRange″ : ″Each Pages″,
″divisionPageNumbers″ : 100
```

FIG. 19C

TEST CASE3:

```
″language″ : ″English″ ,
″ divisionPageRange″ : ″Specified Pages″ ,
″divisionPageNumbers″ : 0
```

FIG. 19D

TEST CASE4

```
″language″ : ″English″,
″ divisionPageRange″ : ″Specified Pages″ ,
″divisionPageNumbers″ : 100
```

FIG. 20A

```
″filename″ : {
     “inputType″ : ″text″ ,
},
```

FIG. 20B

```
″filename″ : {
     ″inputType″ : ″text″ ,
      ″inputMax″ : 100,
      ″inputMin″ : 0
},
```

| APPLICATION ID | DATE | FINAL RESULT | TEST CASE | TEST CASE RESULT |
|---|---|---|---|---|
| app001 | 2017/2/13 | OK | TEST CASE 1 (PARAMETER INFORMATION 1, PARAMETER INFORMATION 2, ···) | OK |
| | | | TEST CASE 2 (PARAMETER INFORMATION 3, ···) | OK |
| | | | ··· | ··· |
| app002 | 2017/1/15 | NG | TEST CASE 1( ···) | OK |
| | | | TEST CASE 2( ···) | NG |
| | | | ··· | ··· |
| ··· | ··· | ··· | ··· | ··· |

TEST RESULT INFORMATION

```
″app_type″ : ″scan″,
″appName″ : ″OCR Division Application″,
″displayName″ : {
  ″Japanese″ : ″OCR Bunkatsu App″,
   ″English″ : ″OCR App″
 },
″loginType″ : ″none″,
″flowName″″ : ″ocr-divide″,
″viewTemplate″ : “Single Screen″,
″defaultParameters″ : {
    ″detail0″ : {
         ″language″ : ″English″,
     }
},
″userInputParameters″ : {
    ″detail1″ : [
         ″divisionPageRange″ : {              ┐
                  ″inputType″ : ″text″,       │
                  ...                         ├1210
         },                                   ┘
         ″divisionPageNumbers″{
                  ″inputType″ : ″text″,
                  ″max″ : 100,
                  ″min″ : 0,
                  ...
         }
    ]
}
```

```
"componentName" : "PDF", }1501
"operations" : {
    {
        "operationName" : "divideByPageNumbers",  }1502
       "parameters": [                                          --1503
            {
                "name" : "divisionPageRange",
                "defaultValue": "Each Pages",
                "optionValues": [
                    "Each Pages",
                    "Specified Pages"
                ],
            }
       ]
    },
    ...
}
```

INFORMATION PROCESSING SYSTEM, INFORMATION PROCESSING APPARATUS, AND INFORMATION PROCESSING METHOD FOR TESTING A SERIES OF PROCESSES OF ONE OR MORE APPLICATIONS

CROSS-REFERENCE TO RELATED APPLICATION

This patent application is based on and claims priority pursuant to 35 U.S.C. § 119(a) to Japanese Patent Application Nos. 2017-105902, filed on May 29, 2017 and 2017-184189, filed on Sep. 25, 2017, in the Japan Patent Office, the entire disclosures of which are hereby incorporated by reference herein.

BACKGROUND

Technical Field

The present disclosure relates to an information processing system, an information processing apparatus, and an information processing method.

Related Art

In recent years, a service in which a plurality of functions (for example, scanning, printing, an email distributing, etc.) are combined is known. For example, a service of generating an electronic file (image file) by scanning, performing predetermined processing on the electronic file, and transmitting by email the processed electronic file is known. Such a service is provided by executing a series of processes including one or more processes for implementing the functions.

Additionally, an image forming apparatus that executes a series of processes based on instructions, which include processing information in which one or more processes are described as the series of processes, is known.

SUMMARY

An example of the embodiments includes an information processing system including one or more information processing apparatuses each of which performs a plurality of programs to implement functions.

The information processing system includes a memory configured to store application information associating flow information and application configuration information for each of one or more applications that performs, when executed, a series of processes using electronic data. The flow information defines program identification information identifying each of one or more programs, which is executed to perform a process included in the series of processes, and an order of executing the one or more programs. The application configuration information defines parameter information used to execute each of the one or more programs, and flow identification information identifying the corresponding flow information.

The information processing system includes circuitry to receive, from one of a plurality of electronic apparatuses connected to the information processing system, a registration request including the application configuration information generated by the one of the plurality of electronic apparatuses, and generate one or more test cases used to test the series of processes based on the parameter information defined in the application configuration information included in the registration request received. Each test case indicating a combination of pieces of the parameter information. The circuitry further acquires the flow information identified with the flow identification information defined in the application configuration information included in the registration request and executes, according to the order of executing the one or more programs defined in the flow information, the one or more programs each of which is identified with the program identification information defined in the flow information acquired, to test the series of processes. Each program being executed using the combination of the pieces of the parameter information indicated with each test case generated.

BRIEF DESCRIPTION OF THE DRAWINGS

A more complete appreciation of the disclosure and many of the attendant advantages and features thereof can be readily obtained and understood from the following detailed description with reference to the accompanying drawings, wherein:

FIG. 6 is an illustration of an example of a type conversion information table;

FIG. 7 is an illustration of an example of processing flow information;

FIG. 15 is an illustration of an example of application configuration information;

FIGS. 17A and 17B are illustrations of examples of test result screens;

FIGS. 19A to 19D are illustrations of examples of test cases;

FIGS. 20A and 20B are examples of parameter information in which any character string is settable as a parameter value;

FIG. 21 is an illustration of an example of test result information;

FIG. 30 is an illustration of another example of the application configuration information; and FIG. 31 is an illustration of an example of component information.

Figure 1:
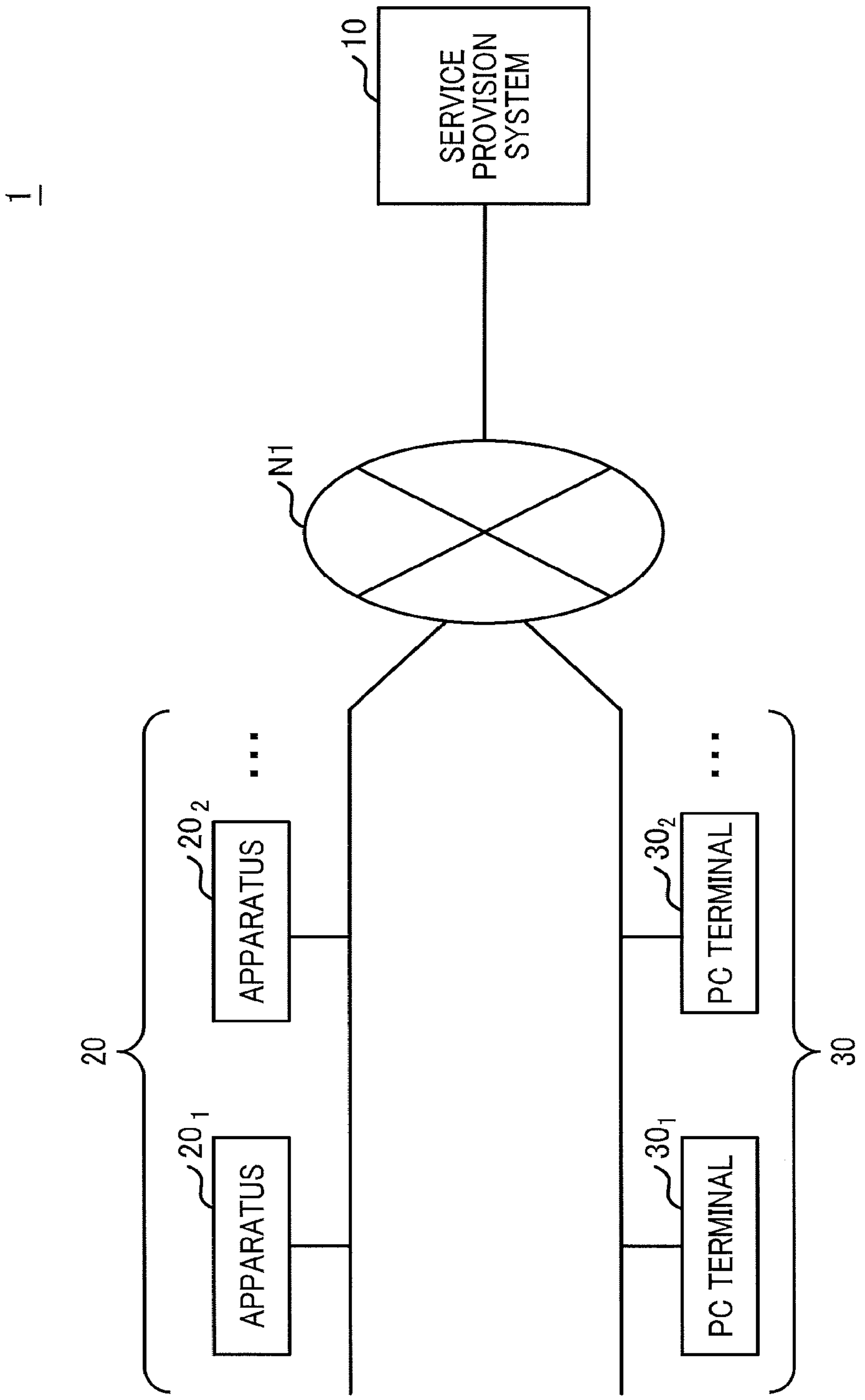
FIG. 1 is a diagram illustrating an example of a system configuration of an information processing system according to a first embodiment.

The accompanying drawings are intended to depict example embodiments of the present disclosure and should not be interpreted to limit the scope thereof. The accompanying drawings are not to be considered as drawn to scale unless explicitly noted.

DETAILED DESCRIPTION

The terminology used herein is for describing particular embodiments only and is not intended to be limiting of the present disclosure. As used herein, the singular forms "a", "an" and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof. In describing preferred embodiments illustrated in the drawings, specific terminology is employed for the sake of clarity. However, the disclosure of this patent specification is not intended to be limited to the specific terminology so selected, and it is to be understood that each specific element includes all technical equivalents that have the same function, operation in a similar manner, and achieve a similar result.

A description is given of several embodiments of the present disclosure with reference to drawings.

First Embodiment

<System Configuration>

A system configuration of an information processing system 1 according to a first embodiment is described below with reference to FIG. 1. FIG. 1 is a diagram illustrating an example of the system configuration of the information processing system 1 according to the present embodiment.

As illustrated in FIG. 1, the information processing system 1 includes a service provision system 10, an apparatus 20, a personal computer (PC) terminal 30, which are communicably connected to each other through a wide area network N1 such as the Internet.

The service provision system 10 includes one or more information processing apparatuses and provides, thorough the network N1, various types of services. Each service is provided by executing a series of processes in which one or more processes for implementing various types of functions are combined.

The functions, mentioned above, are defined as functions that are related to an electronic file such as a document file and an image file. Examples of the functions include printing, scanning, facsimile data transmitting, data format converting, email distributing, optical character recognition processing, data processing, data compressing/decompressing, and data storing to repository.

Specific examples of the services provided by the service provision system 10 according to the present embodiment are deferred. In the following description of the present embodiment, the series of processes may be referred to as a "processing flow".

The apparatus 20 is one of various types of electronic apparatuses that is used by a user. More specifically, the apparatus 20 includes, for example, a multifunction peripheral (MFP) such as an image forming apparatus, a personal computer (PC), a projector, an electronic whiteboard, and a digital camera. The user uses the various services provided by the service provision system 10 with the apparatus 20.

In the following description, an index may be used to distinguish each of the plurality of apparatuses 20 as follows: "apparatus 201", "apparatus 202" . . . .

The PC terminal 30 includes, for example, a desktop PC, a note type PC, a smartphone, and a tablet terminal, each of which is used by a user. The user uses the various services provided by the service provision system 10 with the PC terminal 30.

In the following description, an index may be used to distinguish each of the plurality of terminal PCs 30 as follows: "PC terminal 301", "PC terminal 302" . . . .

The illustration of FIG. 1 is one example of the configuration of the information processing system 1, and the information processing system 1 may have another suitable system configuration. For example, the information processing system 1 according to the present embodiment may include various types of apparatuses each of which inputs electronic data or output electronic data, and is able to use the various services provided by the service provision system 10.

<Hardware Configuration>

A hardware configuration of each of the service provision system 10 and the PC terminal 30 included in the information processing system 1 according to the present embodiment is described below with reference to FIG. 2. FTG. 2 is a block diagram illustrating an example of a hardware configuration of each of the service provision system 10 and the PC terminal 30 according to the present embodiment. The service provision system 10 and the PC terminal 30 have the same or similar hardware configuration as or to each other, and the service provision system 10 is mainly used to describe the hardware configuration below.

Figure 2:
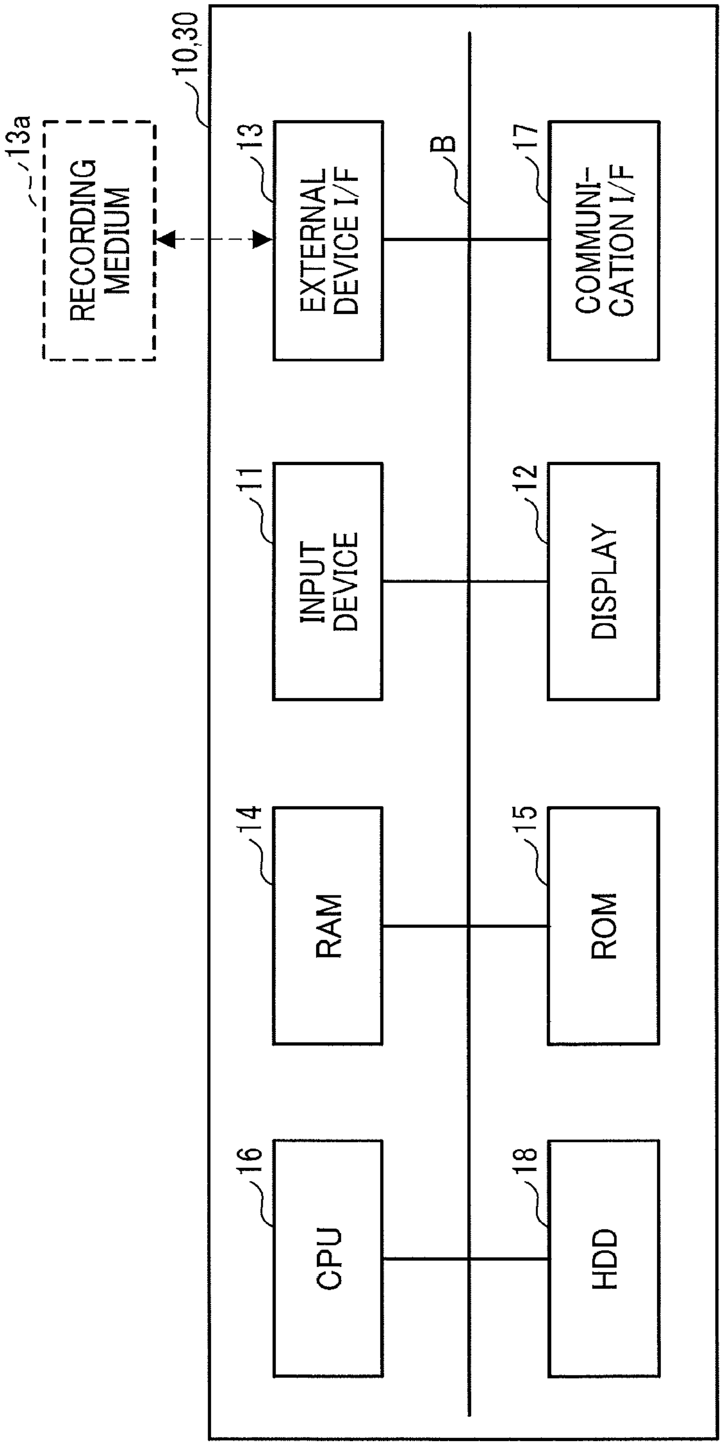
FIG. 2 is a block diagram illustrating an example of a hardware configuration of any one of a service provision system and a personal computer (PC) terminal according to the first embodiment.

As illustrated in FIG. 2, the service provision system 10 includes an input device 11, a display 12, an external device interface (I/F) 13, and a random access memory (RAM) 14. The service provision system 10 further includes a read only memory (ROM) 15, a central processing unit (CPU) 16, a communication I/F 17, and a hard disk drive (HDD) 18. The above-mentioned hardware components are connected to each other through a bus B.

The input device 11 includes at least one of a keyboard, a mouse, a touch panel, and the like, used to input various operation signals by the user. The display 12 includes a liquid crystal display (LCD) and displays results of processing performed by the service provision system 10. At least one of the input device 11 and the display 12 is not necessarily constantly connected to the bus B in the service provision system 10, but is connected to the bus B when being used.

The communication I/F 17 is an interface that connects the service provision system 10 to the network N1. With the configuration described above, the service provision system 10 performs data communication via the communication I/F 17.

The HDD 18 is a nonvolatile storage device that stores a program and/or data. Examples of the program and/or the data stored in the HDD 18 include an operating system (OS), which is basic software used for controlling overall operation of the service provision system 10, and application software providing various functions on the OS.

In one or more embodiments, the service provision system 10 includes, instead of or in addition to the HDD 18, a drive device such as a solid state drive (SSD), which uses a flash memory as a recording medium. The HDD 18 manages the stored program and/or the stored data by a predetermined file system and/or a predetermined database.

The external device I/F 13 is an interface that connects the service provision system 10 with an external device. An Example of the external device includes a recording medium 13*a*. With this configuration, the service provision system 10 reads from and/or writes to the recording medium 13*a* via the external device I/F 13. Examples of the recording medium 13*a* include a flexible disc, a compact disc (CD), a digital versatile disc (DVD), a SD memory card, and a universal serial bus (USB) memory.

The ROM 15 is a nonvolatile semiconductor memory that holds a program and/or data even after the service provision system 10 is turned off and when the power is not supplied. The ROM 15 stores the program and/or data such as a basic input output system (BIOS), which is executed when the service provision system 10 starts up, an OS configuration, and a network configuration. The RAM 14 is a volatile semiconductor memory that temporarily stores a programs and/or data.

The CPU 16 reads a program and/or data from a storage device such as the ROM 15 and the HDD 18 onto the RAM 14, and performs processing to controls the service provision system 10 and implements functions of the service provision system 10.

With the hardware configuration as illustrated in FIG. 2, each of the service provision system 10 and the PC terminal 30 according to the present embodiment implements various types of processing as described later.

Figure 3:
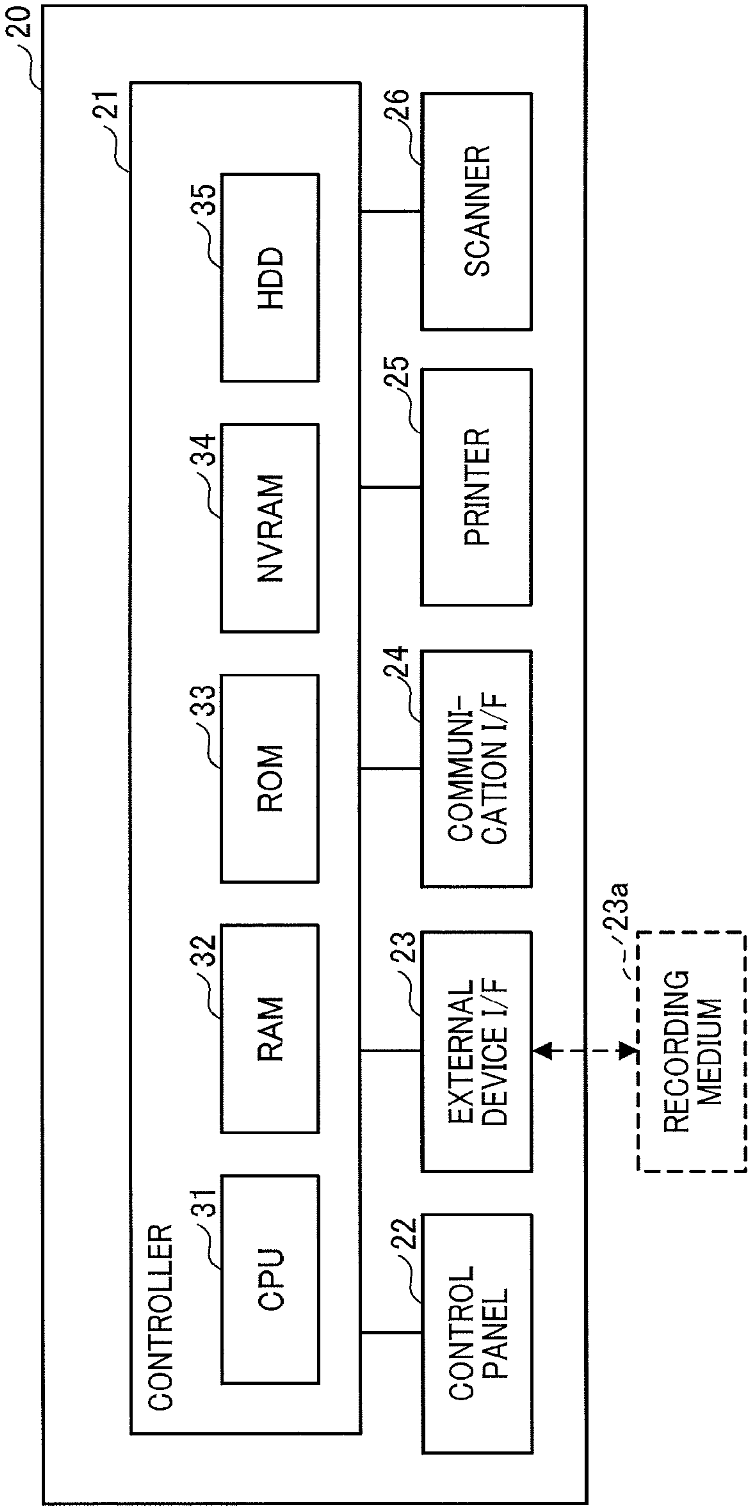
FIG. 3 is a diagram illustrating an example of a hardware configuration of an apparatus according to the first embodiment.

A hardware configuration of the apparatus 20, as which an image forming apparatus is used here, included in the information processing system 1 according to the present embodiment is described below with reference to FIG. 3. FIG. 3 is a diagram illustrating an example of the hardware configuration of the apparatus 20 according to the present embodiment.

As illustrated in FIG. 3, the apparatus 20 includes a controller 21, a control panel 22, an external device interface (I/F) 23, a communication interface (I/F) 24, a printer 25, and a scanner 26. The controller 21 includes a CPU 31, a RAM 32, a ROM 33, a non-volatile random access memory (NVRAM) 34, and an HDD 35.

The ROM 33 is a nonvolatile semiconductor memory that stores various programs and/or data. The RAM 32 is a volatile semiconductor memory, which temporarily stores programs and/or data. The NVRAM 34 stores configuration information, for example. The HDD 35 is a nonvolatile storage device that stores various programs and/or data.

The CPU 31 is a processing device that reads programs and/or data from the ROM 33, the NVRAM 34, the HDD 35, etc., onto the RAM 32, and executes processing to controls the apparatus 20 and implements functions of the apparatus 20.

The control panel 22 includes an input unit that receives a user input, and a display unit that displays various information. The external device I/F 23 is an interface that connects the apparatus 20 to an external device. Examples of the external device include a recording medium 23*a*. The external device I/F 23 enables the apparatus 20 to read and/or write data from and/or to the recording medium 23*a*. Examples of the recording medium 23*a* include an integrated circuit (IC) card, a flexible disc, a compact disc (CD), a digital versatile disc (DVD), a secure digital (SD) memory card, and a USB memory.

The communication I/F 24 is an interface that connects the apparatus 20 to a network. The apparatus 20 performs data communication via the communication I/F 24. The printer 25 is a printing device that performs printing according to print data. The scanner 26 is a reading device that scans a document to generate an electronic file (image file).

With the hardware configuration as illustrated in FIG. 3, the apparatus 20 according to the present embodiment implements various types of processing as described later.

<Services Provided by Service Provision System>

Examples of the services provided by the service provision system 10 according to the present embodiment are described below. In the following description, an MFP is used as the apparatus 20.

In the present embodiment, a service of performing an optical Character Recognition (OCR) processing on an electronic file (image file), which is generated by scanning a document with the apparatus 20, to output a PDF (Portable Document Format) file and dividing the PDF file in pages is referred to as "OCR division service". In the description of the embodiment, the service provision system 10 provides the OCR division service.

The service provision system 10 is required to register an application (application information 1000, which is described later) which enables the apparatus 20 to use the OCR division service so that the service provision system 10 provides the OCR division service.

Therefore, in the present embodiment, a case where the PC terminal 30 registers the application for using the OCR division service and a case where the OCR division service is used by the apparatus 20 using the application are described.

However, this service is one example of the services provided by the service provision system 10, and the service provision system 10 may provide any other suitable services. The service provision system 10 may provide a service of email distributing with which the apparatus 20 scans a document to generate an electronic file and encrypts the electronic file to be sent via an electronic mail.

Similarly, the service provision system 10 may provide a service of faxing with which the apparatus 20 scans a document to generate an electronic file and adds a predetermined information to the electronic file to be faxed.

Functional Configuration

Figure 4:
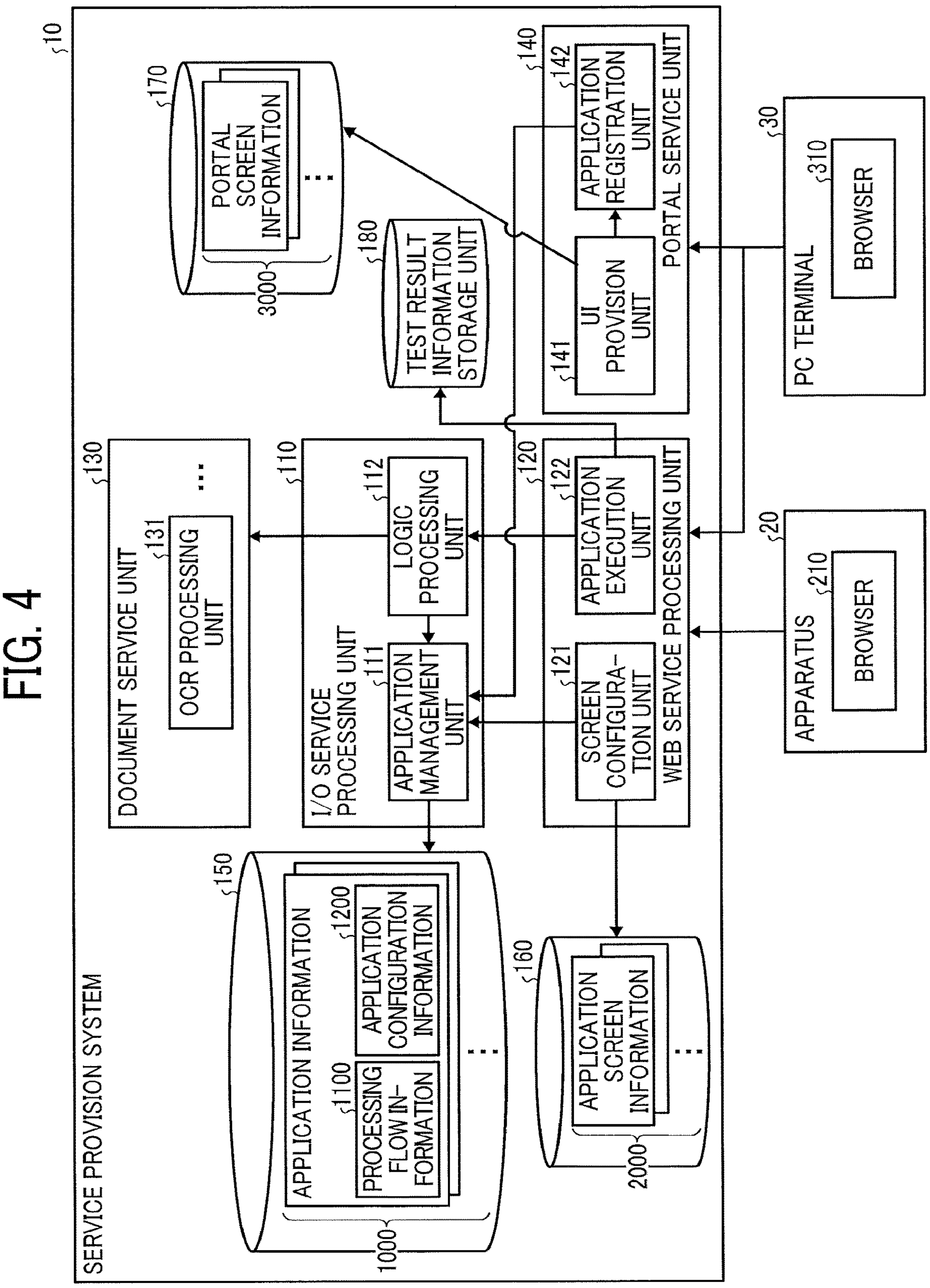
FIG. 4 is a diagram illustrating an example of a functional configuration of the information processing system according to the first embodiment.

A description is given below of a functional configuration of the information processing system 1 according to the present embodiment with reference to FIG. 4. FIG. 4 is a diagram illustrating an example of the functional configuration of the information processing system 1 according to the present embodiment.

The PC terminal 30 illustrated in FIG. 4 includes a browser 310 executed by, for example, the CPU 16. The user of the PC terminal 30 registers, to the service provision system 10 with the browser 310, applications corresponding to the various services including the "OCR division service" to be used.

The apparatus 20 illustrated in FIG. 4 includes a browser 210 executed by, for example, the CPU 31. The user of the apparatus 20 uses each of the various services including the "OCR division service" with the browser 210. That is, the apparatus 20 is required to include merely the browser 210 to use such services, which, here, means that the apparatus 20 may not have an application program dedicated to each service provided by the service provision system 10.

As illustrated in FIG. 4, the service provision system 10 includes an input/output (I/O) service processing unit 110, a web service processing unit 120, a document service unit 130, and a portal service unit 140. Each of the above-mentioned functional units is implemented by executing one or more programs installed in the service provision system 10, with the CPU 16 of the service provision system 10.

The service provision system 10 further includes an application information storage unit 150, an application screen information storage unit 160, a portal screen information storage unit 170, and a test result information storage unit 180. Each of the above-mentioned storage units is implementable with, for example, the HDD 18. Alternatively, at least one of the above-mentioned storage units may be implemented with a storage device connected to the service provision system 10 through a network.

The I/O service processing unit 110 operates in relation to the service provided by the service provision system 10. The I/O service processing unit 110 includes an application management unit 111 and a logic processing unit 112.

The application management unit 111 manages application information 1000 stored in the application information storage unit 150. The application information 1000 is an application that enables the user to use each service provided by executing the series of processes. In other words, each service provided by the service provision system 10 is provided by the application information 1000.

The application management unit 111 also sends processing flow information 1100 included in the application information 1000 to the logic processing unit 112 in response to a request from the logic processing unit 112. The processing flow information 1100 defines each series of processes implementing a corresponding service provided by the application information 1000.

The application management unit 111 causes the application information storage unit 150 to store the application information 1000 according to a request from the portal service unit 140. Accordingly, the application information 1000 (application) for providing the service is registered in the service provision system 10.

The logic processing unit 112 acquires the processing flow information 1100 included in the application information 1000 from the application management unit 111 in response to a request from the web service processing unit 120. The logic processing unit 112 executes the series of processes (processing flow) for providing the service provided by the application information 1000 based on the processing flow information 1100 acquired from the application management unit 111. Accordingly, the service provision system 10 according to the present embodiment provides the various services including the "OCR division service". A detailed description of the logic processing unit 112 is deferred.

The web service processing unit 120 operates so that the user of the apparatus 20 uses each of the various services including the "OCR provision service" with the browser 210. That is, the web service processing unit 120 serves as an application server providing the browser 210 with the web application (application information 1000). The web service processing unit 120 includes a screen configuration unit 121 and an application execution unit 122.

In response to a request from the browser 210, the screen configuration unit 121 sends application screen information 2000 stored in the application screen information storage unit 160 and application configuration information 1200 included in the application information 1000 stored in the application information storage unit 150 to the browser 210.

The application screen information 2000 is information that defines a format of a screen (application screen) that enables the user to use the service provided by the application information 1000. The application screen information 2000 is the information defining the format of the application screen using, for example, hypertext markup language (HTML), extensible hypertext markup language (XHTML), cascading style sheets (CSS), and Java Script (registered trademark).

Additionally, the application configuration information 1200 is information that defines various settings of the application (application information 1000). The application configuration information 1200 defines parameter information used for executing the series of processes, for example. The parameter information includes, for example, user input parameter information in which a value of a parameter is input by the user and default parameter information in which a default value is set to a parameter. Additionally, the application configuration information 1200 defines, for example, input items used for input regarding the parameter information by the user with the application screen and display information of the application screen (e.g., application name). The application configuration information 1200 defines the various settings of the application by JavaScript Object Notation (JSON), for example.

With this, the application screen, which enables the user to use the service provided by the service provision system 10 with the browser 210, is displayed with the apparatus 20.

In response to a request from the browser 210, the application execution unit 122 sends a request to execute the application (application information 1000) to the I/O service processing unit 110. Additionally, when the application (application information 1000) is tested, the application execution unit 122 stores, in the test result information storage unit 180, test result information indicating a test result that is a result obtained by executing the series of processes based on the processing flow information 1100, which is included in the application information 1000.

The application is tested to check whether the application operates normally when, for example, the application (application information 1000) is newly registered or when settings of the application registered are modified.

The document service unit 130 executes a predetermined processing included in the series of processes (processing flow) according to the processing flow information 1100. The document service unit 130 includes an OCR processing unit 131.

The OCR processing unit 131 performs OCR processing on an electronic file and generates a portable document format (PDF) file to which texts recognized in the OCR processing are given (PDF including texts).

The document service unit 130 may further include other various functional units such as a compression/decompression unit configured to compress and/or decompress an electronic file and a data format conversion unit configured to convert a data format of an electronic file.

The portal service unit 140 operates so that the user registers an application using the browser 310 of the PC terminal 30. The portal service unit 140 includes a user interface (UI) provision unit 141 and an application registration unit 142.

In response to a request from the browser 310, the UI provision unit 141 sends portal screen information 3000 stored in the portal screen information storage unit 170 to the browser 310. A portal is defined as a web site capable of registering an application using the browser 310.

The portal screen information 3000 is information that defines various screens, such as a portal top screen and an application registration screen. The portal screen information 3000 defines the various screens with the browser 210, such as HTML, XML, CSS, and JavaScript, for example.

With this configuration, the PC terminal 30 displays the portal top screen and the application registration screen, etc. using the browser 310. Accordingly, the user of the PC terminal 30 performs registration operation to register the application (application information 1000) with the application registration screen.

The application registration unit 142 requests the application management unit 111 to register the application (application information 1000) in response to a request from the UI provision unit 141. That is, the application registration unit 142 sends the request to the application management unit 111 when the registration operation is performed.

The application information storage unit 150 stores the application information 1000. The application information 1000 is stored in the application information storage unit 150 in association with an application identification (ID) identifying the application information 1000. The application ID is, for example, a uniform resource locator (URL) of the application information 1000 or identification information included in the URL of the application information 1000.

The application information 1000 includes the processing flow information 1100 and the application configuration information 1200. For example, the application information 1000 that provides the OCR division service includes the processing flow information 1100 in which the series of processes for implementing the service is defined and the application configuration information 1200 in which the various settings of the application information 1000 are defined. Hereinafter, the application information 1000 providing the OCR division service may be referred to as an "OCR division application".

The application information 1000 may include two or more pieces of the processing flow information 1100 and two or more pieces of the application configuration information 1200.

As described above, the processing flow information 1100 is information in which the series of processes implementing the service provided by the application information 1000 is defined. A detailed description of the processing flow information 1100 is deferred.

Additionally, the application configuration information 1200 is information defining the various settings of the application (application information 1000) as described above. A detailed description of the application configuration information 1200 is deferred.

The application screen information storage unit 160 stores the application screen information 2000. The application screen information 2000 is stored in the application screen information storage unit 160 in association with the application ID.

The portal screen information storage unit 170 stores the portal screen information 3000. The portal screen information 3000 is stored in the portal screen information storage unit 170 in association with the URL of the portal top screen or the application registration screen, for example.

The test result information storage unit 180 stores the test result information. The test result information includes a test result of the application, a test case, etc.

Each of I/O service processing unit 110, the web service processing unit 120, the document service unit 130, and the portal service unit 140 may be implemented in corresponding one of the one or more information processing apparatuses.

Figure 5:
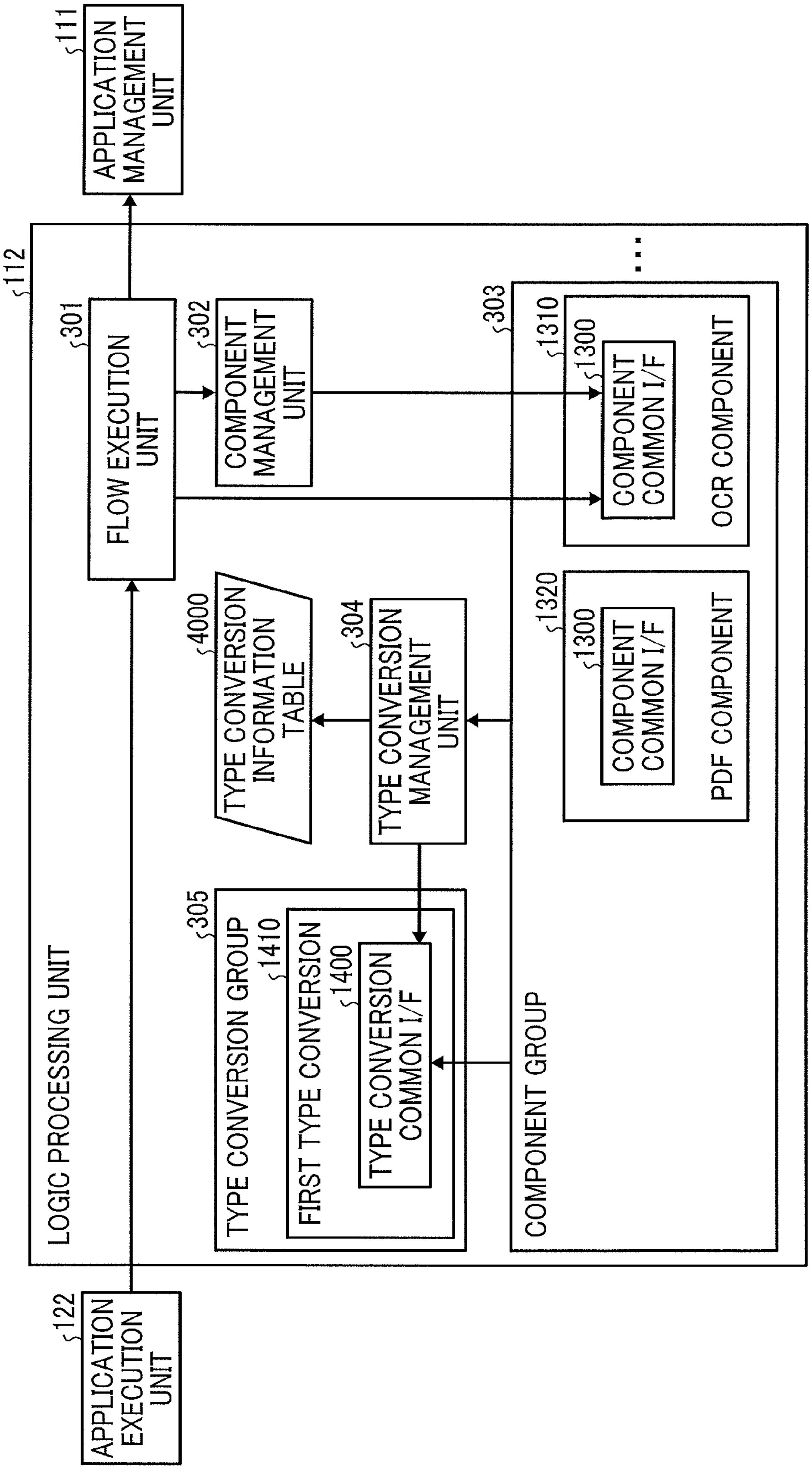
FIG. 5 is a block diagram illustrating an example of a functional configuration of a logic processing unit according to the first embodiment.

A detailed description is given below of a functional configuration of the logic processing unit 112 with reference to FIG. 5. FIG. 5 is a block diagram illustrating an example of the functional configuration of the logic processing unit 112 according to the present embodiment.

As illustrated in FIG. 5, the logic processing unit 112 includes a flow execution unit 301, a component management unit 302, a component group 303, a type conversion management unit 304, and a type conversion group 305. Further, the logic processing unit 112 includes a type conversion information table 4000.

Upon receiving a request to execute the application from the application execution unit 122, the flow execution unit 301 acquires, from the application management unit 111, the processing flow information 1100 corresponding to the request. Subsequently, the flow execution unit 301 executes the series of processes (processing flow) based on the processing flow information 1100 acquired from the application management unit 111.

The series of processes based on the processing flow information 1100 is executed by combining components each of which is for executing each process included in the series of processes. Each component is implemented by, for example, a program or a module to provide a predetermined function, and defined as, for example, a class or a function.

The component management unit 302 manages the components. The component management unit 302 generates the component in response to a request from the flow execution unit 301 and sends the generated component to the flow execution unit 301. Generating the component means expanding the component that is defined as, for example, a class or a function, to a memory such as the RAM 14.

The component group 303 is a set of components. The component group 303 includes an OCR component 1310 and a PDF component 1320.

The OCR component 1310 is a component that is for performing the OCR processing on the electronic file (image file). The OCR component 1310 requests the OCR processing unit 131 of the document service unit 130 to perform the OCR processing on the electronic file.

The PDF component 1320 is a component that is for generating a plurality of PDF files by dividing a page of the PDF file.

As described above, each component performs corresponding processing to implement the predetermined function. The component group 303 further includes other various components such as an encryption/decryption component for encrypting and decrypting an electronic file and a compression component for compressing an electronic file.

Additionally, each component of the component group 303 includes a component common interface (I/F) 1300. The component common I/F 1300 is an application programming interface (API) defined for each component in common, and includes an API for generating the component and an API for executing processing of the component.

With this configuration in which each component has the component common I/F 1300, effect caused by, for example, newly adding another component is localized. That is, the component is added without giving any effect on the flow execution unit 301 and/or the component management unit 302, for example. This allows the service provision system 10 according to the present embodiment to reduce developing steps required by adding a function (i.e., adding a component that performs processing to implement the function), etc.

The type conversion management unit 304 manages a type conversion of a data type. The data type compatible with each component is determined in advance. The type conversion management unit 304, accordingly, refers to the type conversion information table 4000 as illustrated in FIG. 6 to generate a type conversion included in the type conversion group 305 in response to a request from the component.

Further, the type conversion management unit 304 requests the generated type conversion to perform type conversion processing. The type conversion is implemented by a program or a module for performing the type conversion processing of the data type, and is defined as, for example, a class or a function. In addition, generating the type conversion means expanding the type conversion, which is defined as, for example, a class or a function, to a memory such as the RAM 14.

Examples of the data type include "InputStream" indicating stream data, "LocalFilePath" indicating a path (address) of the electronic file stored in the storage device, etc., and "File" indicating an entity of the electronic file.

A description is given below of the type conversion information table 4000 with reference to FIG. 6. FIG. 6 is an illustration of an example of the type conversion information table 4000.

As illustrated in FIG. 6, the type conversion information table 4000 includes data type before conversion, data type after conversion, and type conversion to be generated as data items. That is, type conversion information stored in the type conversion information table 4000 associates each set of a data type before conversion and a data type after conversion with a type conversion used for converting the data type before conversion to the data type after conversion.

The type conversion group 305 is a collection of type conversions. The type conversion group 305 includes first type conversion 1410 for converting the data type from "InputStream" to "LocalFilePath". The type conversion group 305 includes other type conversion such as a second type conversion for converting the data type from "LocalFilePath" to "FILE".

Additionally, each of the type conversions included in the type conversion group 305 includes a type conversion common interface 1400. The type conversion common interface 1400 is an API defined for each type conversion in common, including an API for generating the type conversion and an API for performing type conversion processing of the type conversion.

With this configuration, in which the component common I/F 1400 is included in each component, effect of addition of a component is localized, for example. In other words, a type conversion is added without giving any effect on the type conversion management unit 304, etc. Thus, the service provision system 10 according to the present embodiment is able to reduce developing steps required by adding the type conversion.

A description is given of the processing flow information 1100 included in the application information 1000 that provides the OCR division service, with reference to FIG. 7. FIG. 7 is an illustration of an example of the processing flow information 1100.

The processing flow information 1100 illustrated in FIG. 7 is information in which the series of processes (processing flow) that implements the OCR division service is defined.

The processing flow information 1100 illustrated in FIG. 7 includes a flow name 1101 and flow details 1102. The flow name 1101 identifies the processing flow information 1100. The flow details 1102 define a content of each of the processes included in the processing flow.

The flow details 1102 include a detailed process definition 1110 and a detailed process definition 1120 each of which defines a process included in the processing flow. Each of the detailed process definition 1110 and the detailed process definition 1120 includes "detailName" indicating a detailed process name identifying the detailed process definition and "component" indicating a component name of a corresponding component for performing processing. Each of the detailed process definition 1110 and the detailed process definition 1120 further includes "operationName" indicating an operation to be performed by the component and "parameters" defining corresponding parameter information.

The operation is processing performed by the component, and each component is able to perform one or more operations.

More specifically, referring to FIG. 7, "detail0" is defined as "detailName" of the detailed process definition 1110. As "component" of the detailed process definition 1110, "OCR", which is a component name of the OCR component 1310, is defined. Additionally, as "operationName" of the detailed process definition 1110, "process", which is an operation name indicating that the OCR component 1310 performs the OCR processing, is defined. Furthermore, as "parameters" of the detailed process definition 1110, the parameter information of (a piece of parameter information) of a parameter name of "outputSize" is defined.

In the piece of the parameter information of the parameter name of "outputSize", a print size of the PDF file output as a result of the OCR processing is set. In the example of the processing flow information 1100 illustrated in FIG. 7, "A4" is defined as a default parameter value in the piece of the parameter information of the parameter name of "outputSize".

Similarly, "detail1" is defined as "detailName" of the detailed process definition 1120. As "component" of the detailed process definition 1120, "PDF", which is a component name of the PDF component 1320, is defined. Additionally, as "operationName" of the detailed process definition 1120, "divideByPageNumbers", which is an operation name indicating that the PDF component 1320 performs the processing of dividing the PDF file by a page number. Furthermore, as "parameters" of the detailed process definition 1120, the parameter information used by the PDF component 1320 is defined.

An order of executing the processes each of which is defined with the detailed process definition is defined in a manner that the processes are sequentially performed from top to down in the flow details 1102. That is, in executing the series of processes (processing flow) based on the processing flow information 1100 illustrated in FIG. 7, the process defined with the detailed process definition 1110 is performed and then the process defined with the detailed process definition 1120. However, the present disclosure is not limited to this. For example, the processing flow information 1100 may defines, for example, an order of performing the processes each of which is defined with the detailed processing definitions.

<Process>

Figure 8:
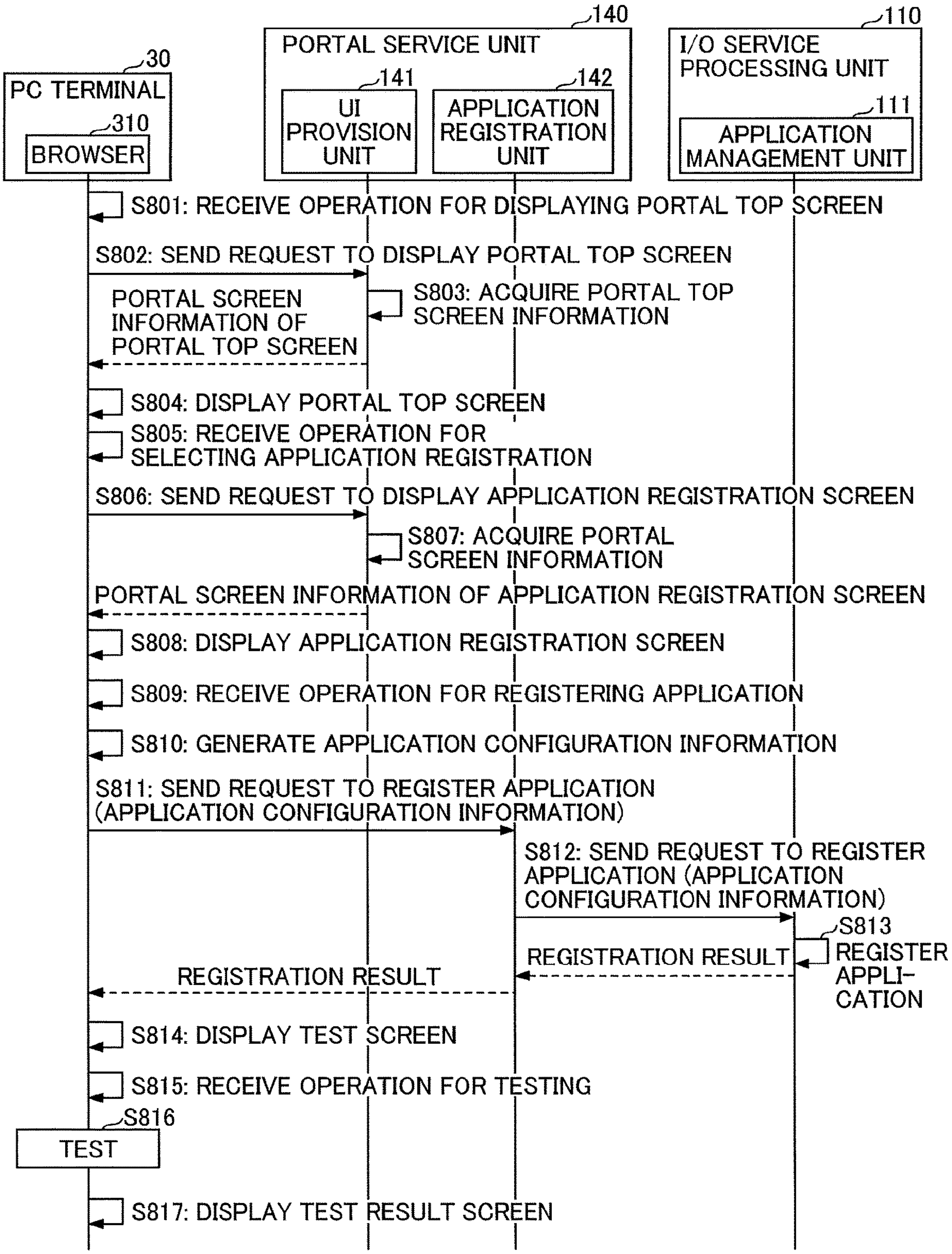
FIG. 8 is a sequence diagram illustrating an example of a process of registering an application, according to the first embodiment.

A detailed description is given below of processes performed by the information processing system 1 according to the present embodiment. A description is given of a process of registering the OCR division application to the service provision system 10 by a user of the PC terminal 30 with reference to FIG. 8. FIG. 8 is a sequence diagram illustrating an example of the process of registering the application, according to the embodiment.

The browser 310 of the PC terminal 30 receives operation for displaying the portal top screen (display operation for the portal top screen) (S801). The user of the PC terminal 30 performs the operation for displaying the portal top screen by inputting a URL of the portal top screen to an address bar of the browser 310, for example.

Upon receiving the operation for displaying the portal top screen, the browser 310 of the PC terminal 30 sends a display request of the portal top screen (portal top screen acquisition request) to the UI provision unit 141 of the portal service unit 40 (S802).

Upon receiving the portal top screen acquisition request, the UI providing unit 141 of the portal service unit 140 acquires the portal screen information of the portal top screen from the portal screen information storage unit 170 (S803). Subsequently, the UI provision unit 141 sends the portal screen information acquired from the portal screen information storage unit 170 to the browser 310.

Figure 9:
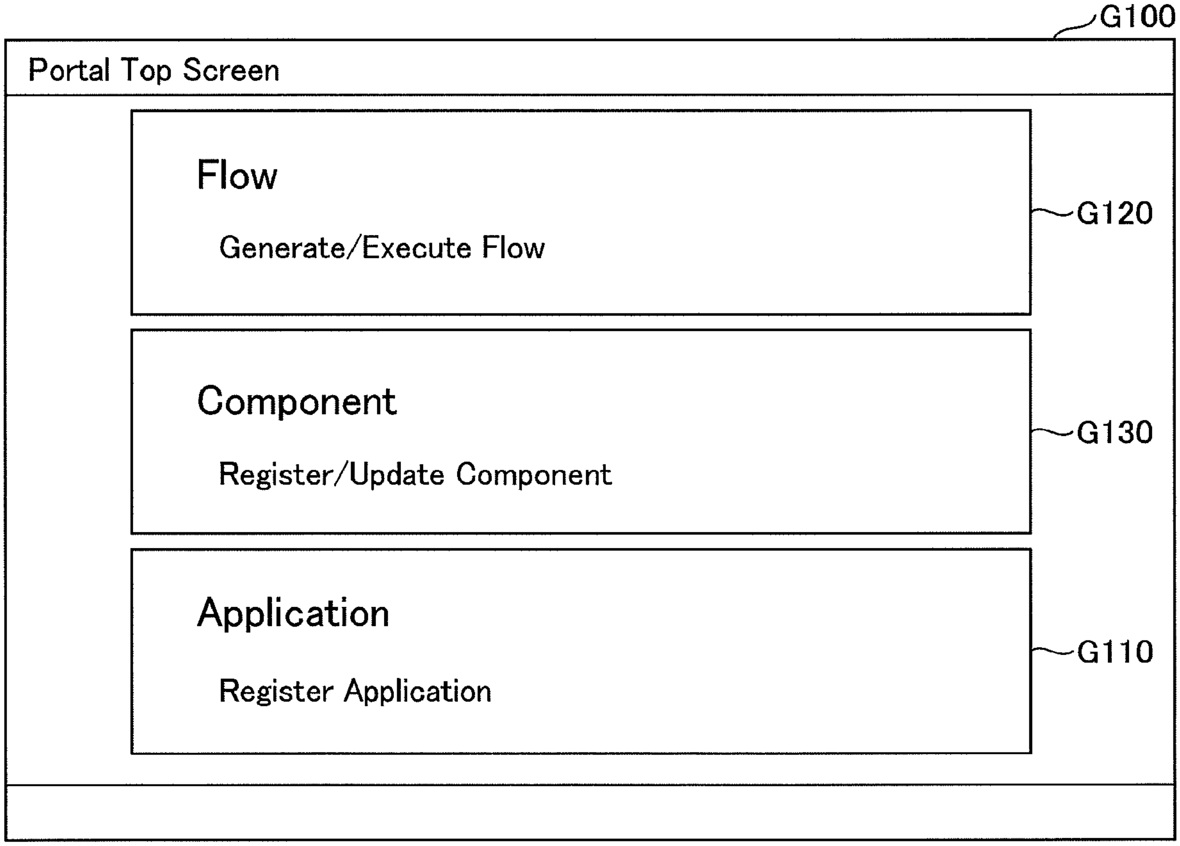
FIG. 9 is an illustration of an example of a portal top screen.

Upon receiving the portal screen information of the portal top screen, the browser 310 of the PC terminal 30 displays a portal top screen G100 of FIG. 9, for example, based on the portal top screen information (S804).

The portal top screen G100 illustrated in FIG. 9 is a top screen of the portal and includes an "Application" button G110 used for registering an application. Here, in the following description, the user performs an operation of selecting the "Application" button G110 on the portal top screen G100 illustrated in FIG. 9 (operation of selecting application registration), for example.

Additionally, the portal top screen G100 illustrated in FIG. 9 includes a "Flow" button G120 used for, for example, generating the processing flow information 1100, a "Component" button G130 used for, for example, registering components. That is, with the portal top screen G100, in addition to registering the application, the user generates and/or executes the processing flow, and/or registers and/or updates the components.

The browser 310 of the PC terminal 30 receives the operation of selecting application registration (S805).

Upon receiving the operation of selecting application registration, the browser 310 of the PC terminal 30 sends a request to display an application registration screen, to the UI provision unit 141 of the portal service unit 140 (S806).

Upon receiving the request to display an application registration screen, the UI providing unit 141 of the portal service unit 140 acquires the portal screen information of the application registration screen from the portal screen information storage unit 170 (S807). Subsequently, the UI provision unit 141 sends the portal screen information acquired from the portal screen information storage unit 170 to the browser 310.

Figure 10:
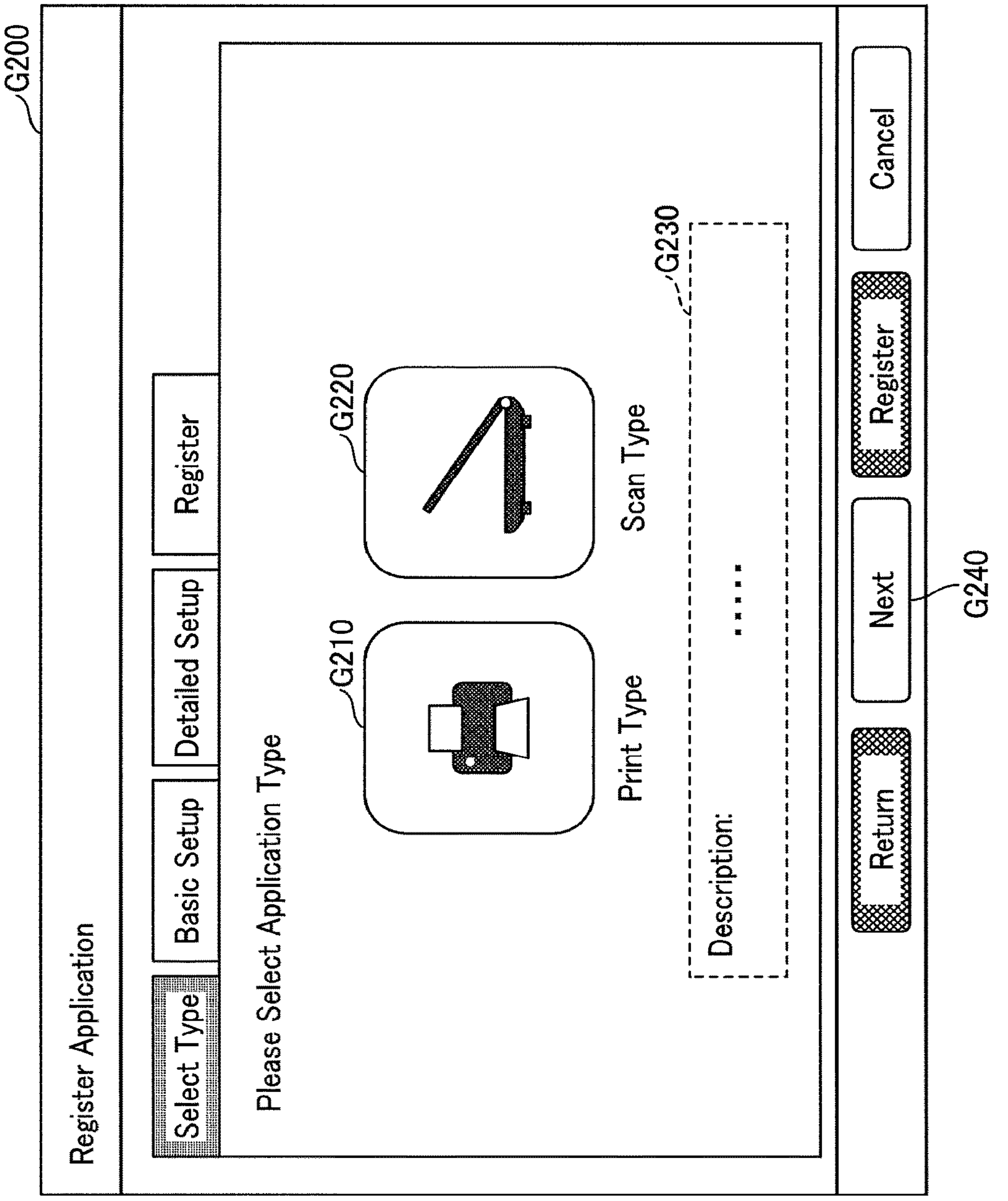
FIG. 10 is an illustration of an example of application registration screen (1/5)

Upon receiving the portal screen information of the application registration screen, the browser 310 of the PC terminal 30 displays an application registration screen G200 of FIG. 10, for example, based on the portal screen information (S808).

A description is given below of a registration of the application performed by the user with reference to FIG. 10 to FIG. 14.

The application registration screen G200 illustrated in FIG. 10 is a screen that enables the user to select a type of the application to be registered.

The application registration screen G200 illustrated in FIG. 10 includes a "Print" button G210 used for registering a print type application and a "Scan" button G220 used for registering a scan type application. The application registration screen G200 illustrated in FIG. 10 may also include a "Fax" button used for registering a FAX type application and a "mail receiving" button used for registering a mail receiving type application, for example.

Additionally, the application registration screen G200 illustrated in FIG. 10 includes a "Next" button G240 used for transitioning to a next screen.

The application registration screen G200 illustrated in FIG. 10 has a description field G230 in which a description of the print type is displayed when the user selects the "print" button G210 or the scan type is displayed when the user selects the "scan" button G220.

The print type application is defined as a type of the application with which an electronic file indicating a processing result of a series of processes is printed out with an image forming apparatus, for example. The scan type application is defined as a type of the application with which a series of processes is performed with an input that is an electronic file generated by scanning with an image forming apparatus, for example.

The FAX type application is defined as a type of the application with which an electronic file indicating a processing result of a series of processes is transmitted by a facsimile communication device with an image forming apparatus, for example. The mail receiving type application is defined as a type of the application with which a series of processes is performed with an input that is an electronic file attached to a mail received with an image forming apparatus, for example.

Here, the description is given in a case where the user performs an operation of pressing the "Next" button G240 after selecting the "Scan" button G220 on the application registration screen G200 illustrated in FIG. 10, for example. Upon receiving the operation, the browser 310 displays an application registration screen G300 of FIG. 11, for example.

Figure 11:
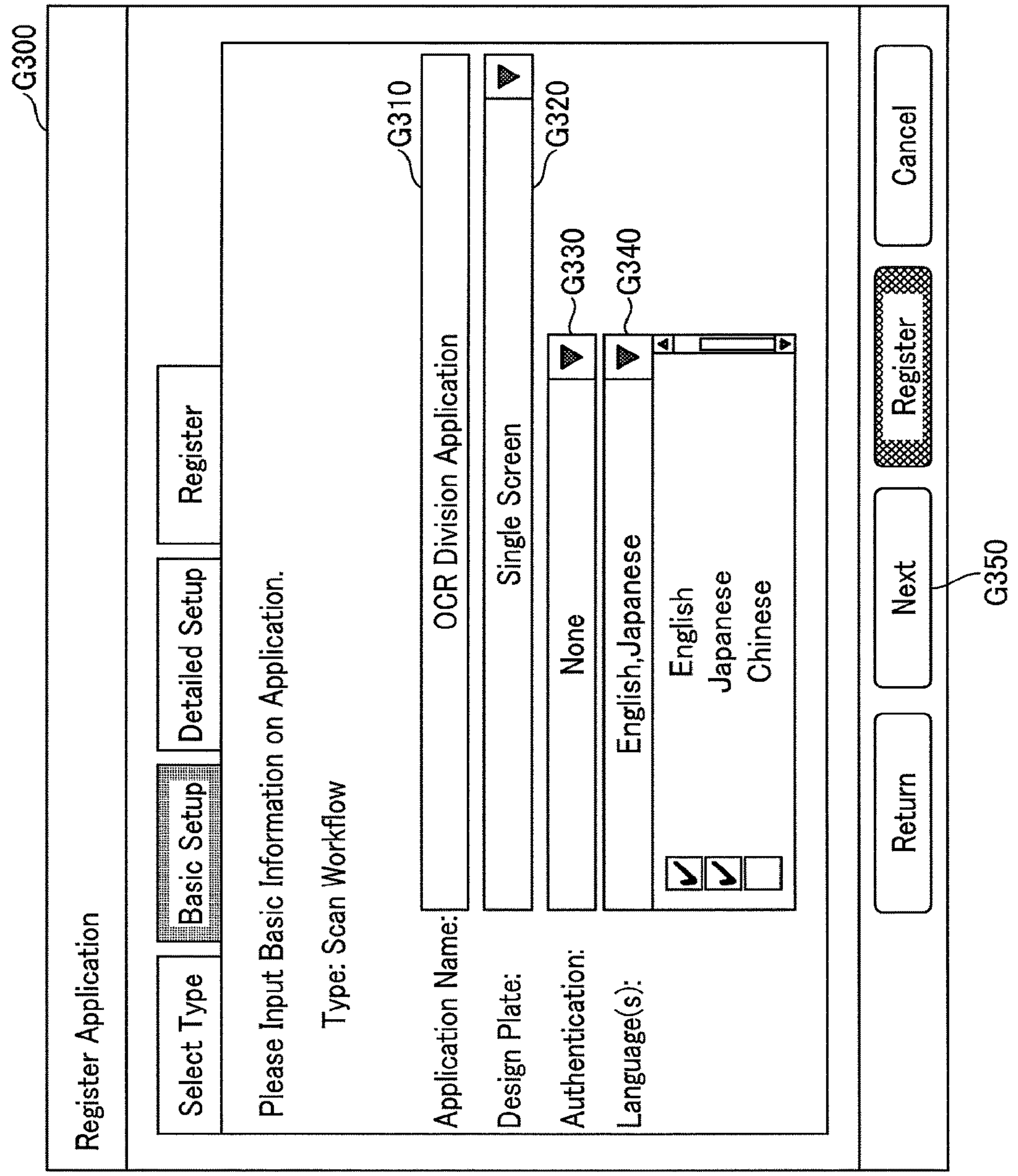
FIG. 11 is an illustration of another example of the application registration screen (2/5)

The application registration screen G300 illustrated in FIG. 11 is a screen for setting basic information of the application by the user.

The application registration screen G300 illustrated in FIG. 11 includes an "Application Name" input setting field G310 used for setting an application name and a "Design Plate" select field G320 used for selecting a screen format of the application screen. The application registration screen G300 illustrated in FIG. 11 also includes an "Authentication" select field G330 used for authenticating in using the application and "Language(s)" select field G340 for selecting at least one language to be displayed in the application screen. Additionally, the application registration screen G300 illustrated in FIG. 11 includes a "Next" button G350 for transitioning to a next screen.

The "Design Plate" select field G320 enables the user to select a form of the application screen, for example, a "single-screen form" with which the application screen is displayed in a single screen form, a "wizard-screen form" with which the application screen is displayed in a dialog-boxes form, etc. The "Authentication" select field G330 enables the user to select whether to use authentication by selecting, for example, "None" indicating that the authentication is not used or "User Authentication" indicating that the authentication is used.

Here, in the following description, the user performs an operation of pressing the "Next" button G350 after inputting the application name and selecting for the settings as the application registration screen G300 illustrated in FIG. 11, for example. Upon receiving the operation, the browser 310 displays an application registration screen G400 of FIG. 12, for example.

Figure 12:
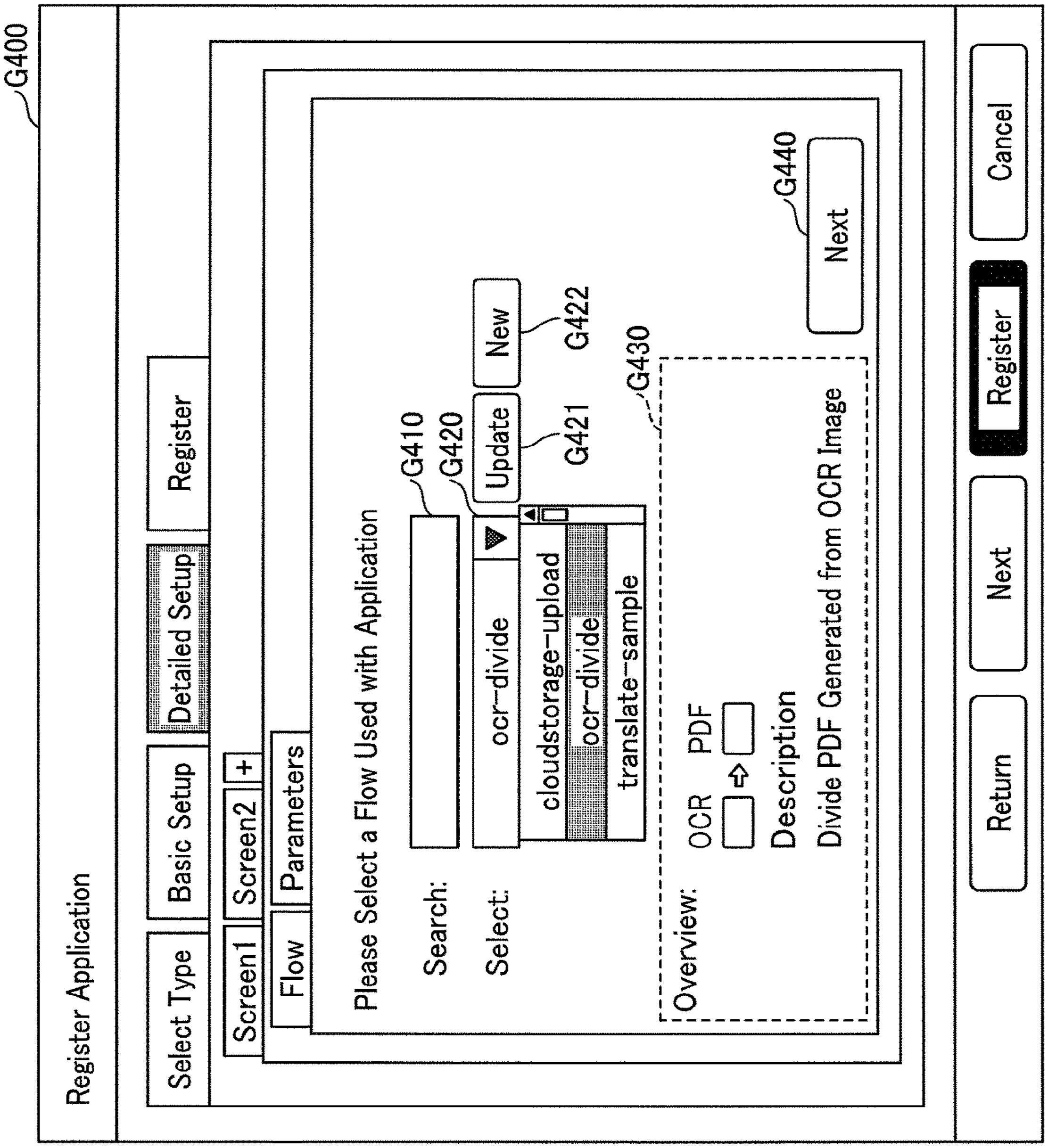
FIG. 12 is an illustration of still another example of the application registration screen (3/5)

The application registration screen G400 illustrated in FIG. 12 is a screen used by the user for setting a series of processes (processing flow) related to the application to be registered, as detailed information on the application.

The application registration screen G400 illustrated in FIG. 12 includes a "Search" field G410 used for searching a flow name of the processing flow information 1100 stored in the application information storage unit 150 and a flow select filed G420 used for selecting a flow name. The user inputs a desired flow name to the Search field G410 and then selects a desired flow name with the flow select field G420.

Additionally, the application registration screen G400 illustrated in FIG. 12 includes an "Overview" field G430 for displaying an overview of the series of processes based on the processing flow information 1100 of the flow name selected with the flow select field G420 and a "Next" button G440 for transitioning to a next screen.

The application registration screen G400 illustrated in FIG. 12 also includes an "Update" button G421 for editing and updating the processing flow information 1100 of the flow name that is selected with the flow select field G420 and a "New" button G422 for newly generating the processing flow information 1100. The user presses the "Update" button G421 to edit and update the processing flow information 1100 of the flow name that is selected with the flow select field G420. Additionally, the user presses the "New" button G422 after generating the processing flow information 1100 to select a flow name for the generated processing flow information 1100 with the flow select field G420.

Here, in the following description, the user performs an operation of pressing the "Next" button G440 after selecting the flow name of "ocr-divide" with the flow select field G420, for example. Upon receiving the operation, the browser 310 displays an application registration screen G500 of FIG. 13, for example.

Figure 13:
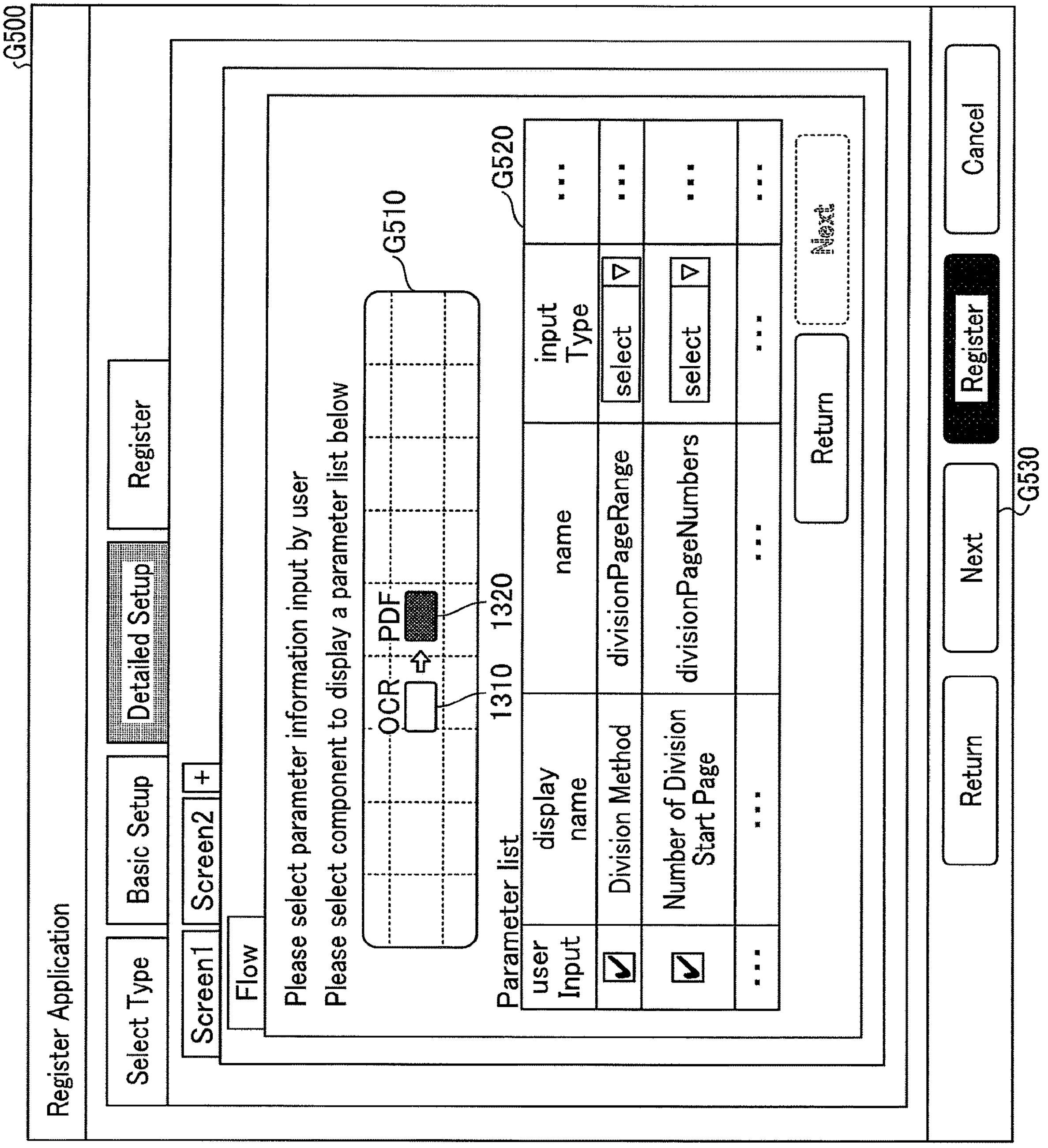
FIG. 13 is an illustration of still another example of the application registration screen (4/5)

The application registration screen G500 illustrated in FIG. 13 is a screen used by the user for setting parameter information of the series of processes (processing flow) set on the application registration screen G400 illustrated in FIG. 12.

The application registration screen G500 illustrated in FIG. 13 includes a "Component" select field G510 used for selecting a component that performs a process included in the series of processes. Additionally, the application registration screen G500 illustrated in FIG. 13 includes a "parameter information" setting field G520 used for setting the parameter information on the component selected with the "Component" select field G510 and a "Next" button G530 for transitioning to a next screen.

The user selects a desired component with the "Component" select field G510 and then selects various settings for the parameter information with the "Parameter Information" setting field G520. For example, when the user selects the PDF component 1320 with the "Component" select field G510, the user sets various settings for the parameter information used by the PDF component 1320 with the "Parameter Information" setting field G520.

The "Parameter Information" setting field G520 includes, for example, "userInput", "displayname", "name", "inputType".

In "userInput", whether to input a parameter value for each piece of the parameter information by the user (user of the service) is set. Regarding each piece of the parameter information that has a check in a check box of "userInput", the user (user of the service) inputs a parameter value. Regarding each piece of the parameter information that has no check in the check box of "userinput", the user (user of the service) is not able to input a parameter value, and the default parameter value is used.

In "inputType", an input method on the application screen is set, for each piece of the parameter information having the check in the set item of "userinput". In "inputType", for example, an input method of "select", to select a desired parameter value from a list of parameter values, an input method of "text" to directly input a parameter value, etc. are set. Additionally, other input methods than the input methods described above may be selected, for example, an input method to input a coordinate on the screen or an input method to select a desired folder or a file.

In "name", a parameter name of each piece of the parameter information is set. Additionally, in "displayname", a display name of an input item (item for inputting a parameter value) to be displayed on the application screen is set.

Accordingly, the user sets whether or not to input a parameter value by a user of the service and an input method to input the parameter value for each piece of the parameter information that is used by a corresponding component.

Here, in the following description, the user performs an operation of pressing the "Next" button G530 after setting the parameter information used by each of the components, for example. Upon receiving the operation, the browser 310 displays an application registration screen G600 of FIG. 14, for example.

Figure 14:
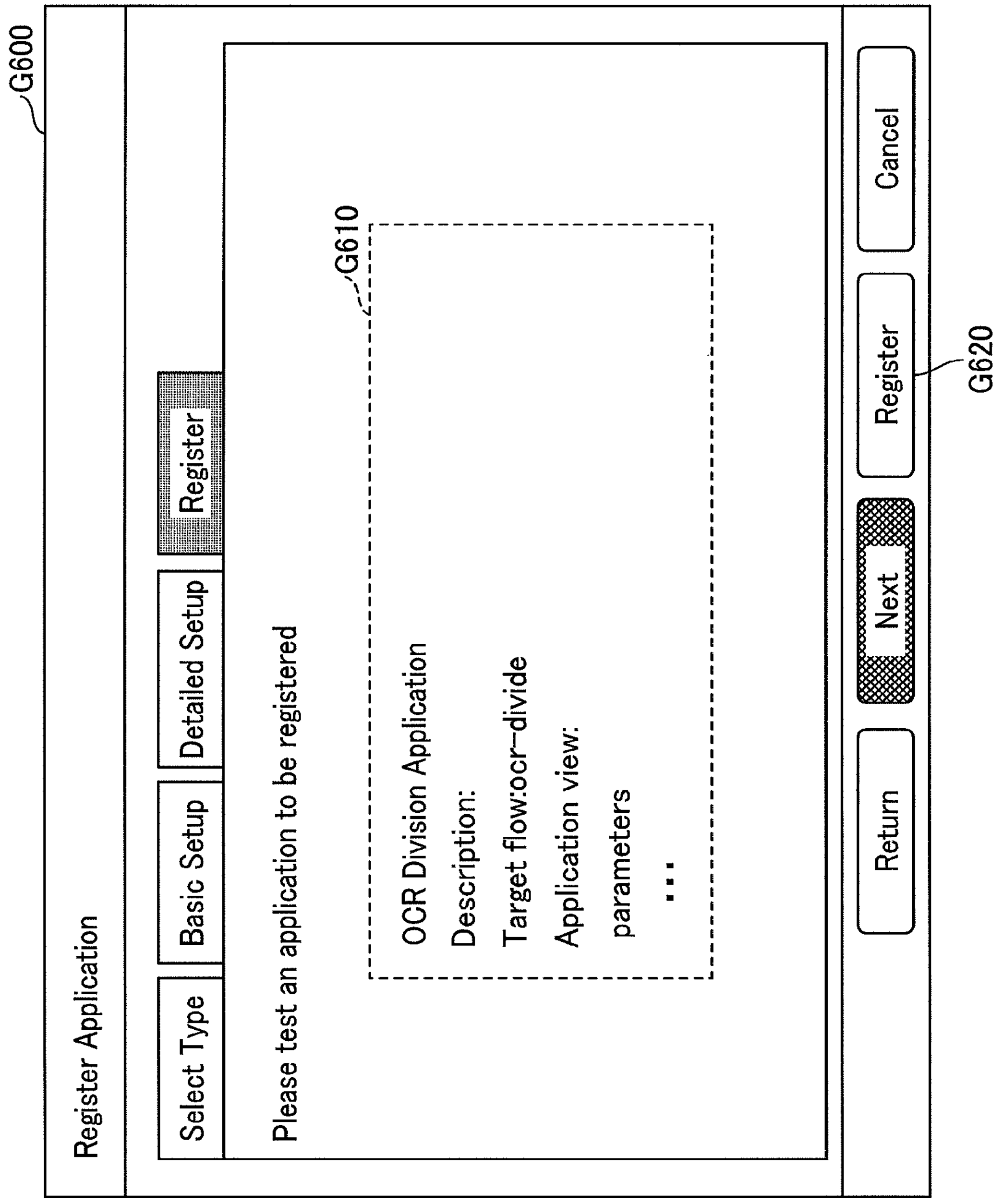
FIG. 14 is an illustration of still another example of the application registration screen (5/5)

The application registration screen G600 illustrated in FIG. 14 is a screen used by the user for confirming the various information (application configuration information) set in the screens FIGS. 10 to 13.

The application registration screen G600 illustrated in FIG. 14 includes an "application configuration information" display field G610 and a "Register" button G620. The user confirms the various information set in the screens illustrated in FIGS. 10 to 13 with the "application configuration information" display field G610.

Here, in the following description, the user confirms the application configuration information with the "application configuration information" display field G610 and then performs an operation of pressing the "Register" button G620 to register the application. The browser 310 receives the operation for registering the application (S809).

Upon receiving the operation of registering the application, the browser 310 generates the application configuration information 1200 as illustrated in FIG. 15, for example (S810).

A description is given below of the application configuration information 1200 with reference to FIG. 15. FIG. 15 is an illustration of an example of the application configuration information 1200.

The application configuration information 1200 illustrated in FIG. 15 includes an application type 1201, an application name 1202, and an application display name 1203, an authentication type 1204, and a flow name 1205. The application configuration information 1200 illustrated in FIG. 15 also includes a design plate type 1206, default parameters 1207, and user input parameters 1208.

The application type 1201 indicates an application type that is selected with the application registration screen G200 illustrated in FIG. 10. In the example illustrated in FIG. 15, "app_type": "scan" indicating that a type of the application is a scan type is defined.

The application name 1202 indicates an application name that is input in the "Application Name" input setting field G310 of the application registration screen G300 illustrated in FIG. 11. In the example illustrated in FIG. 15, "appName":"OCR Division Application" indicating that an application name is "OCR division application" is defined.

The application display name 1203 indicates an application title that is to be displayed on the application screen. In the example illustrated in FIG. 15, "OCR Bunkatsu App" and "OCR App" are defined as an application title, respectively, in Japanese and English.

The authentication type 1204 is an authentication that is selected with "Authentication" select field 330 of the application registration screen G300 illustrated in FIG. 11. In the example illustrated in FIG. 15, "loginType":"none" indicating that an authentication is not used is defined.

The flow name 1205 indicates a flow name that is selected with the flow select field G420 of the application registration screen G400 as illustrated in FIG. 12. In the example illustrated in FIG. 15, "ocr-divide" is defined as a flow name.

The design plate type 1206 indicates a display form that is selected with the "design plate" select field G320 of the application registration screen G300 illustrated in FIG. 11. In the example illustrated in FIG. 15, "viewTemplate": "single-screen form" indicating that the application screen is displayed in a single-screen form is defined.

The default parameters 1207 define one or more pieces of the parameter information for which the user does not input the parameter value on the application screen. That is, the default parameters 1207 define that the one or more pieces of the parameter information for which no check is in the check box of "userinput" in the "Parameter Information" setting field G520 of the application registration screen G500 illustrated in FIG. 13. In the example illustrated in FIG. 15, the default parameter value for the parameter information used for the process defied by the detailed process name of "detail0" (detailed process definition 1110 illustrated in FIG. 7) is defined. More specifically, regarding the piece of the parameter information having a parameter name of "language", the default parameter value of "English" is defined.

As described above, in the default parameters 1207, the one or more pieces of parameter information for each of which a corresponding default parameter value is set are defined. In other words, the user does not set parameter values for the one or more pieces of the parameter information defined in the default parameters 1207.

The user input parameters 1208 define the parameter information for which the user input a parameter value on the application screen. That is, the user input parameters 1208 defines one or more pieces of the parameter information each of which has the check in the check box of "userinput" in the "Parameter Information" setting field G520 of the application registration screen G500 illustrated in FIG. 13.

In the example illustrated in FIG. 15, the parameter information used for the process defied by the detailed process name of "detail1" (detailed process definition 1120 illustrated in FIG. 7) are defined. More specifically, for a piece of the parameter information of the parameter name of "divisionPageRange", an input definition 1210 indicating that the parameter value is to be input by the user is defined. Similarly, for another piece of the parameter information of the parameter name of "divisionPageNumbers", an input definition 1220 indicating that the parameter value is to be input by the user is defined.

In the input definition 1210, "select" is defined in "inputType", which indicates an input method of the parameter value. This indicates that the user selects a desired parameter value from a list of parameter values.

In the input definition 1210, "Each Pages" and "Specified Pages" are defined in "options", which indicates parameter value(s) selectable by a user. This indicates that the list of parameter values selectable by a user includes "Each Pages" and "Specified Pages".

In the input definition 1220, "text" is defined in "inputType", which indicates an input method for the parameter value. This indicates that the parameter value is input by the user with texts (characters).

In the input definition 1220, "100" is defined in "max" that indicates a maximum value of the parameter value inputtable by a user and "0" is defined in "min" that indicates a minimum value of the parameter value inputtable by a user. This indicates that the parameter value inputtable by the user is a numerical value equal to or more than 0 and equal to or less than 100.

As described above, the user input parameters 1208 define the parameter information for which the user input the parameter value on the application screen, the input method for the parameter value, limitation for the input, etc.

As described above, in the application configuration information 1200, the display information including a title, the input items on the application screen (item to input or select a parameter value), the input method used for the input items, and the input limitation are defined. Additionally, in the application configuration information 1200, the parameter information for which the default parameter value is set (namely, the parameter information for which the parameter value is not input or selected on the application screen) is defined.

When generating the application configuration information 1200, the browser 310 sends a request to register the application (application registration request) to the application registration unit 142 of the portal service unit 140 (S811). Additionally, the application registration request includes the application configuration information 1200 generated in S810.

Upon receiving the application registration request, the application registration unit 142 of the portal service unit 140 sends the application registration request to the application management unit 111 of the I/O service processing unit 110 (S812).

Upon receiving the application registration request, the application management unit 111 of the I/O service processing unit 110 registers the application (S813). Then, the application management unit 111 sends a registration result to the browser 310.

That is, the application management unit 111 stores the application configuration information 1200 included in the application registration request in the application information storage unit 150 in association with the application ID. Then, the application management unit 111 sends to the browser 310 the registration result including the application ID.

Through this, the application information 1000 that includes the application configuration information 1200 and the processing flow information 1100 having the flow name defined as the flow name 1205 in the application configuration information 1200 is registered in the service provision system 10.

Figure 16:
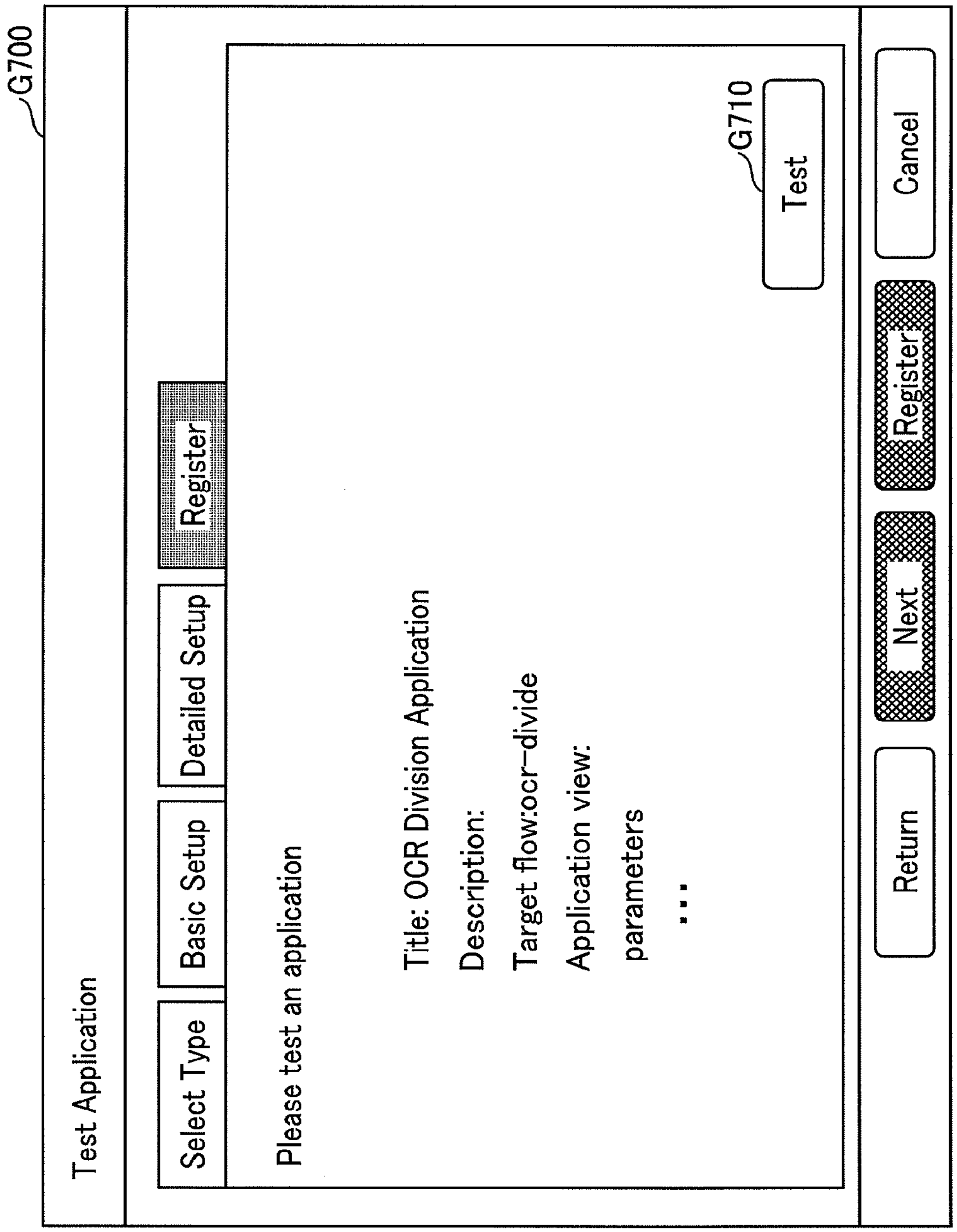
FIG. 16 is an illustration of an example of a test screen.

Upon receiving the registration result, the browser 310 displays a test screen G700 of FIG. 16, for example (S814).

The test screen G700 illustrated in FIG. 16 is a screen for performing a test on the application registered in S813 described above. By performing the test on the application, the user evaluates the application (checks operation, etc.).

The test screen G700 illustrated in FIG. 16 includes a "Test" execution button G710. Here, in the description, the user performs an operation of pressing the "Test" execution button G710, for example. The browser 310 receives the operation for performing a test (S815).

Upon receiving the operation for performing a test, the browser 310 performs a test (S816). In a process of performing a test, test cases for performing the test on the application (namely, some combinations of the pieces of the parameter information used for the processing flow) are generated, and the application is tested for each of the test cases. The test on the application is performed by executing the processing flow of the application for each of the combinations of the pieces of the parameter information indicated with the test case (namely, the series of processes based on the processing flow information 1100 included in the application information 1000). A detailed description of the process of performing the test is deferred.

When the process of performing the test is completed, the browser 310 displays, for example, a test result screen G800 of FIG. 17A or a test result screen G900 of FIG. 17B (S817).

The test result screen G800 illustrated in FIG. 17A is a test result screen that is displayed when the application passes the test, namely when the application completes all of the test cases normally.

On the other hand, the test result screen G900 illustrated in FIG. 17B is a test result screen that is displayed when the application is failed to pass the test, namely when the application failed to perform at least one of the test cases. The test result screen G900 illustrated in FIG. 17B includes a failed test case display field G910.

The failed test case display field G910 includes an execution time of the test case that is failed to be completed and the parameter information used for the test. This enables the user to know the combination(s) of the pieces of the parameter information used for the test case(s) that is (are) failed to be successfully completed. Accordingly, the user modifies the parameter information in a manner that the application passes the test. The parameter information displayed in the failed test case display filed G910 is displayed based on the test result information stored in the test result information storage unit 180.

Figure 18:
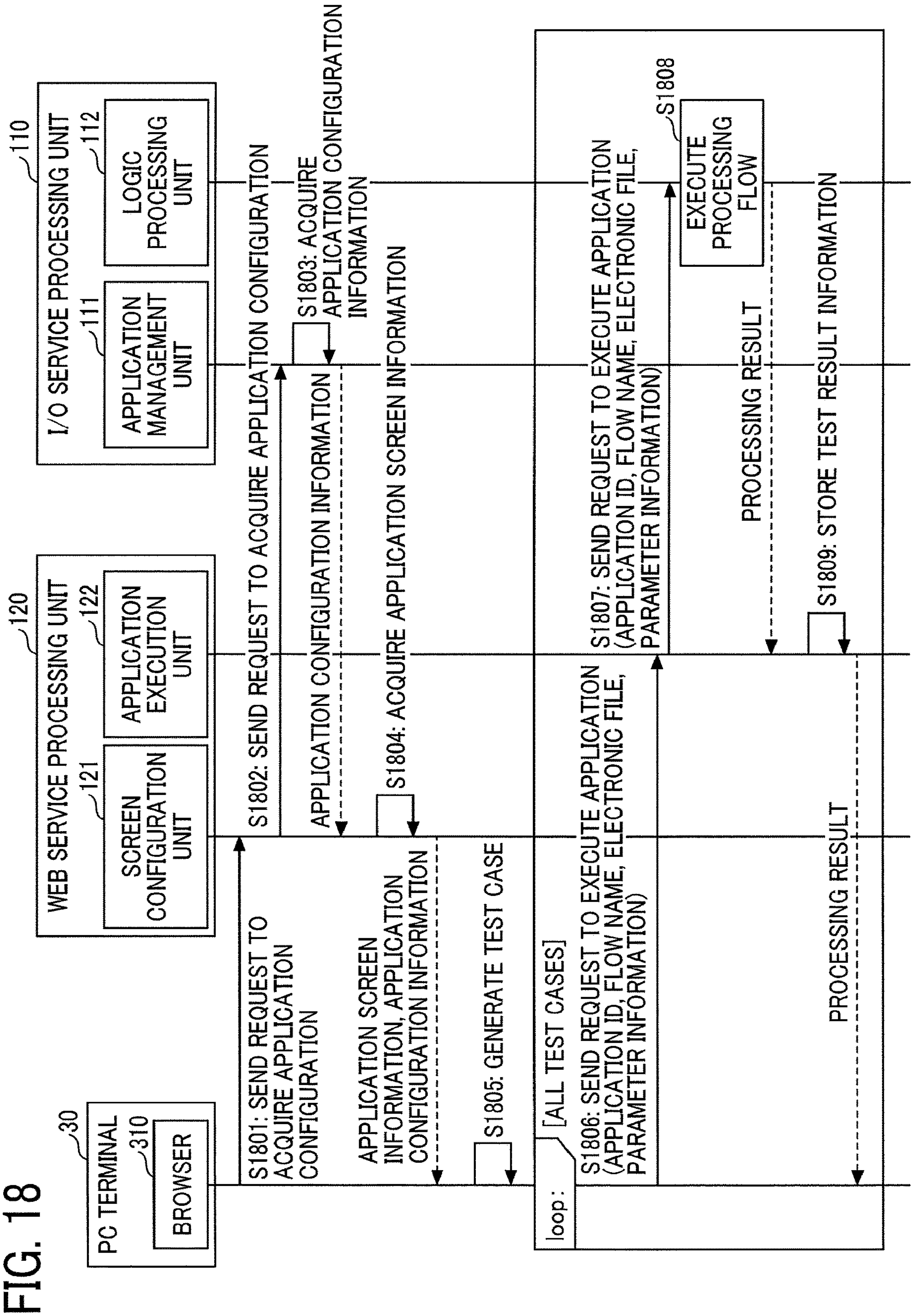
FIG. 18 is a sequence diagram illustrating an example of a process of performing a test, according to the first embodiment.

A detailed description is given below of the process of S816 (process of testing) with reference to FIG. 18. FIG. 18 is a sequence diagram illustrating an example of the process of performing a test, according to the present embodiment.

Upon receiving the operation for testing, the browser 310 sends a request to acquire an application configuration (application configuration acquisition request) to the screen configuration unit 121 of the web service processing unit 120 (S1801). The application configuration acquisition request includes the application ID received from the application management unit 111 in S813 described above.

Upon receiving the application configuration acquisition request, the screen configuration unit 121 of the web service processing unit 120 sends the acquisition request to the application management unit 111 of the I/O service processing unit 110 (S1802).

Upon receiving the acquisition request, the application management unit 111 of the I/O service processing unit 110 acquires the application configuration information 1200 stored in association with the application ID included in the acquisition request from the application information storage unit 150 (S1803). The application management unit 111, then, sends the application configuration information 1200 acquired from the application information storage unit 150 to the screen configuration unit 121.

Subsequently, the screen configuration unit 121 of the web service processing unit 120 acquires the application screen information 2000 for displaying the test result screen G800 and the test result screen G900 from the application screen information storage unit 160 (S1804). The screen configuration unit 121 sends, to the browser 310, the application screen information 2000 acquired from the application screen information storage unit 160 and the application configuration information 1200 received in S1803, which is described above.

Upon receiving the application screen information 2000 and the application configuration information 1200, the browser 310 generates each test case by combining the pieces of parameter information from the application configuration information 1200, by using, for example, all pair method (pair wise method) (S1805).

For example, when receiving the application configuration information 1200 illustrated in FIG. 15, the browser 310 generates each test case by combining the pieces of parameter information defined in the default parameters 1207 and the user input parameters 1208.

More specifically, the default parameters 1207 define "language":"English", so that "English" is used as a parameter value for a piece of the parameter information of the parameter name of "language".

Additionally, the input definition 1210 of the user input parameters 1208 define "Each Pages" and "Specified Pages" that are selectable parameter values for "divisionPageRange". Accordingly, "Each Pages" and "Specified Pages" are used as parameter values for a piece of the parameter information of the parameter name of "divisionPageRange".

Additionally, the input definition 1220 of the user input parameters 1208 define "100" and "0" as a maximum value and a minimum value of parameter, respectively, for "divisionPageNumbers". Accordingly, "100" and "0" are used as a maximum value and a minimum value of parameter, respectively, for a piece of the parameter information of the parameter name of "divisionPageNumbers".

Accordingly, four test cases illustrated in FIGS. 19A to 19D are generated by combining the parameter values for the pieces of the parameter information described above. As described above, the test cases are generated by combining one or more parameter values corresponding to the pieces of the parameter information defined in the application configuration information 1200. At this time, when the parameter values are selectively defined, for example, the combinations may be made with these parameter values selectively defined. Alternatively, when a range of the parameter value is defined, a maximum value, a minimum value, and an intermediate value may be combined.

Alternatively, there may be a case where the user inputs a case name, in which an arbitrary character string input by the user is to be a parameter value for a piece of the parameter information. More specifically, as the parameter information of the parameter name of "filename" as illustrated in FIG. 20A, an arbitrary character string input by the user is the parameter value for the piece of the parameter information. In this case, the browser 310 generates the test case by using the character string randomly generated as a parameter value and combining the character string with other parameter values for other pieces of the parameter information.

Additionally, as the parameter information having the parameter name of "filename" illustrated in FIG. 20B, when the parameter information having the parameter value that is a character string including the number of characters equal to or more than 0 and equal to or less than 100, the character string including the number of characters equal to or more than 0 and equal to or less than 100 may be generated.

When the default parameter value is defined in the processing flow information 1100, a test case in which a piece of the parameter information of the parameter value is combined may be generated. For example, in the detailed process definition 1110 of the processing flow information 1100 illustrated in FIG. 7, "A4" is defined as a default parameter value of the piece of the parameter information of the parameter name of "outputSize". Accordingly, a test case in which, in addition to the parameter information defined in the application configuration information 1200, the piece of the parameter information of "outputSize":"A4" defined in the processing flow information 1100 is included may be generated.

The subsequent process from S1806 to S1809 is performed for each of the test cases generated in S1805.

The browser 310 sends, to the application execution unit 122 of the web service processing unit 120, a request to execute the application (application execution request) for each of the test cases generated in S1805 described above (S1806). The application execution request includes the application ID, the flow name of "ocr-divide", which is defined as the flow name 1205 in the application configuration information 1200, an electronic file used for the test, and the parameter information indicated by the test case.

The electronic file used for the test is, for example, a dummy electronic file for the test.

The parameter information indicated by the test case is, for example, the combination of the pieces of the parameter information generated in S1805 described above.

For example, the parameter information of a test case 1 illustrated in FIG. 19A includes "language":"English", "divisionPageRange":"Each Pages", and "divisionPageNumbers"0".

Similarly, the parameter information of a test case 2 illustrated in FIG. 19B includes "language":"English", "divisionPageRange":"Each Pages", and "divisionPageNumbers"100", for example.

Similarly, the parameter information of a test case 3 illustrated in FIG. 19C includes "language":"English", "divisionPageRange":"Specified Pages", and "divisionPageNumbers"0", for example.

Similarly, the parameter information of a test case 4 illustrated in FIG. 19D includes "language":"English", "divisionPageRange":"Specified Pages", and "divisionPageNumbers"100", for example.

Upon receiving the application execution request, the application execution unit 122 of the web service processing unit 120 sends the execution request to the logic processing unit 112 of the I/O service processing unit 110 (S1807).

Upon receiving the application execution request, the logic processing unit 112 of the I/O service processing unit 110 executes the processing flow (S1808) That is, the logic processing unit 112 executes the series of processes based on the processing flow information 1100 of the flow name included in the execution request using the parameter information included in the execution request. As described above, the test is performed by executing the series of processes based on the processing flow information 1100 using the parameter information indicated by the test case. A detailed description of the process of executing the processing flow is deferred.

Subsequently, the logic processing unit 112 sends a processing result obtained by executing the processing flow to the application execution unit 122 of the web service processing unit 120.

Upon receiving the processing result from the logic processing unit 112, the application execution unit 122 of the web service processing unit 120 generates test result information based on the application ID, the test case, and the processing result, and stores the test result information in the test result information storage unit 180 (S1809). Then, the application execution unit 122 sends the processing result to the browser 310.

The test result information generated and stored by the application execution unit 122 is described with reference to FIG. 21. FIG. 21 is an illustration of an example of the test result information.

As illustrated in FIG. 21, the test result information includes information on an application ID, a test date, and a final test result, a test case, and a test case result.

The application ID is an application ID of the application that is tested. The test date is a date when the test is performed. The final test result is a result finally obtained after all of the test cases are tested, and indicates "OK" when all of the test case results indicate "OK". The final test result indicates "NG" when at least one of the test case results is "NG".

The test case is a test case that is tested, namely a combination of the pieces of the parameter information. The test case result is a test result for each of the test cases.

As descried above, in the test result information, each application on which the test is performed is associated with the final test result and test results each of which corresponds to one of the test cases.

With the information processing system 1 according to the present embodiment, the user registers the applications (application information 1000) easily by setting, for example, the flow name and the parameter information for each component using the PC terminal 30.

With the information processing system 1 according to the present embodiment, the processing flow (processing flow based on the processing flow information 1100 included in the application information 1000) is tested when the application is registered, or modified/updated. This archives to check whether the parameter values for the parameter information defined in the application configuration information 1200 are correct or not, and the registered application or modified/updated application is evaluated in checking the operation of the application, for example.

According to the information processing system 1 according to the present embodiment, the user is able to register or test the applications that provide the various types of services, even when the user does not have expert knowledge or experience related to programming languages, etc. (for example, a person in charge of planning).

Additionally, in the above description of the present embodiment, the test is performed on the application registered, however, this is not limiting. Alternatively, the test may be performed before the application is registered, and the application is allowed to be registered when passing the test.

As described with reference to FIG. 20, there is one or more pieces of the parameter information for each of which the parameter value is input by the user, namely user input parameter information. That is, the parameter value input by the user may give effect on a result obtained by executing the processing flow when the processing flow of the application is tested. That is, when there is no parameter value input by the user for such a piece of the parameter information, namely the user input parameter information, the execution of the processing flow may be failed, or forced to be stopped. Examples of the parameter value input by the user include, for example, an address for mail transmission and authentication information on an external cloud service.

Figure 22:
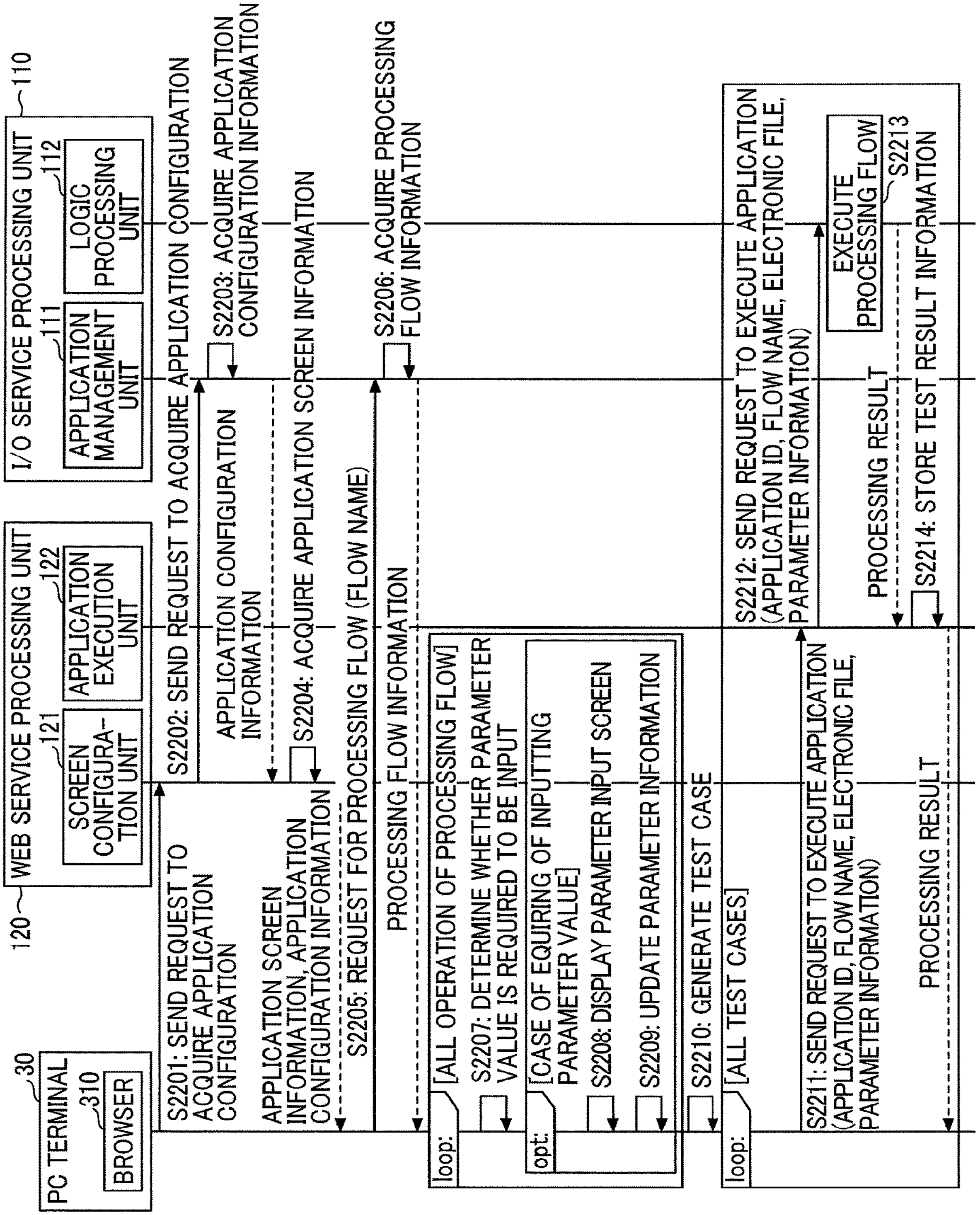
FIG. 22 is a sequence diagram illustrating another example of the process of performing a test, according to the first embodiment.

A description is given below of a process of performing a test in a case where a parameter value is required to be input by the user with reference to FIG. 22. FIG. 22 is a sequence diagram illustrating another example of the process of performing a test, according to the first embodiment. The process from S2201 to S2204 and from S2211 to S2214 in FIG. 22 is substantially the same as the process from S1801 to S1804 and from S1806 to S1809 in FIG. 18, and the description corresponding to the process from S2201 to S2204 and from S2211 to S2214 in FIG. 22 is omitted here.

Subsequent to S2204, upon receiving the application screen information 2000 and the application configuration information 1200 (S2205), the browser 310 sends a request to acquire processing flow information (processing flow acquisition request) to the application management unit 111. The acquisition request includes the flow name defined as the flow name 1205 of the application configuration information 1200.

Upon receiving the processing flow acquisition request, the application management unit 111 acquires the processing flow information 1100 of the flow name that is included in the acquisition request, from the application information storage unit 150 (S2206). The application management unit 111 sends the processing flow information 1100 acquired from the application information storage unit 150 to the browser 310.

The process of S2207 is performed for each operation performed by the processing flow based on the processing flow information 1100. That is, the process of S2207 is performed for each operation defined in "operationName" of the processing flow information 1100.

The browser 310 refers to at least one of the processing flow information 1100 and the application configuration information 1200 in relation to the parameter information corresponding to the operation name to determine whether there is the user input parameter information in which a parameter value is required to be input by the user (S2207). The browser 310 may determine whether there is the user input parameter information in which a parameter value is required to be input by the user in the parameter information corresponding to the operation name according to the following description (1) to (4).

(1) The browser 310 refers to the processing flow information 1100 to determine whether a flag (user input flag) indicating that a parameter value is to be input by the user is defined or not. When the user input flag is defined in the parameter information, the browser 310 determines that the parameter value of the user input parameter information is to be input by the user.

(2) The browser 310 refers to the processing flow information 1100 to determine whether there is any piece of the parameter information for which a default value is not defined. When there is a piece of the parameter information for which a default value is not defined, the browser 310 determines that the parameter value for the piece of the parameter information is to be input by the user.

There may be a case where the default value for the piece of the parameter information is defined in the application configuration information 1200. Accordingly, in this case, the browser 310 determines that the parameter value for the piece of the parameter information is to be input by the user, when the piece of the parameter information is determined not to have any default value according to the processing flow information 1100 and the application configuration information 1200.

(3) The browser 310 refers to the processing flow information 1100 to determine whether there is any piece of the parameter information for which a user input flag is defined, and a default value is not defined. When there is a piece of the parameter information for which a user input flag is defined, and a default value is not defined, the browser 310 determines that a parameter value of the piece of the parameter information is to be input by the user. As in the description of (2), the browser 310 may determine that the parameter value of the parameter is to be input by the user when the default value is not defined in the application configuration information 1200 either.

(4) The browser 310 refers to the application configuration information 1200 to determine whether any piece of the parameter information is defined in the user input parameters 1208. When a piece of the parameter information is defined in the user input parameters 1208, the browser 310 determines that a parameter value for the piece of the parameter information is to be input by the user. Additionally, the browser 310 may make determination of (4) by combining the determination obtained from (1) to (3).

In S2207, when the determination that there is a piece of the parameter information for which a parameter value is required to be input by the user is made regarding the parameter information corresponding to the operation name, the process from S2208 to S2209 is performed.

Figure 23:
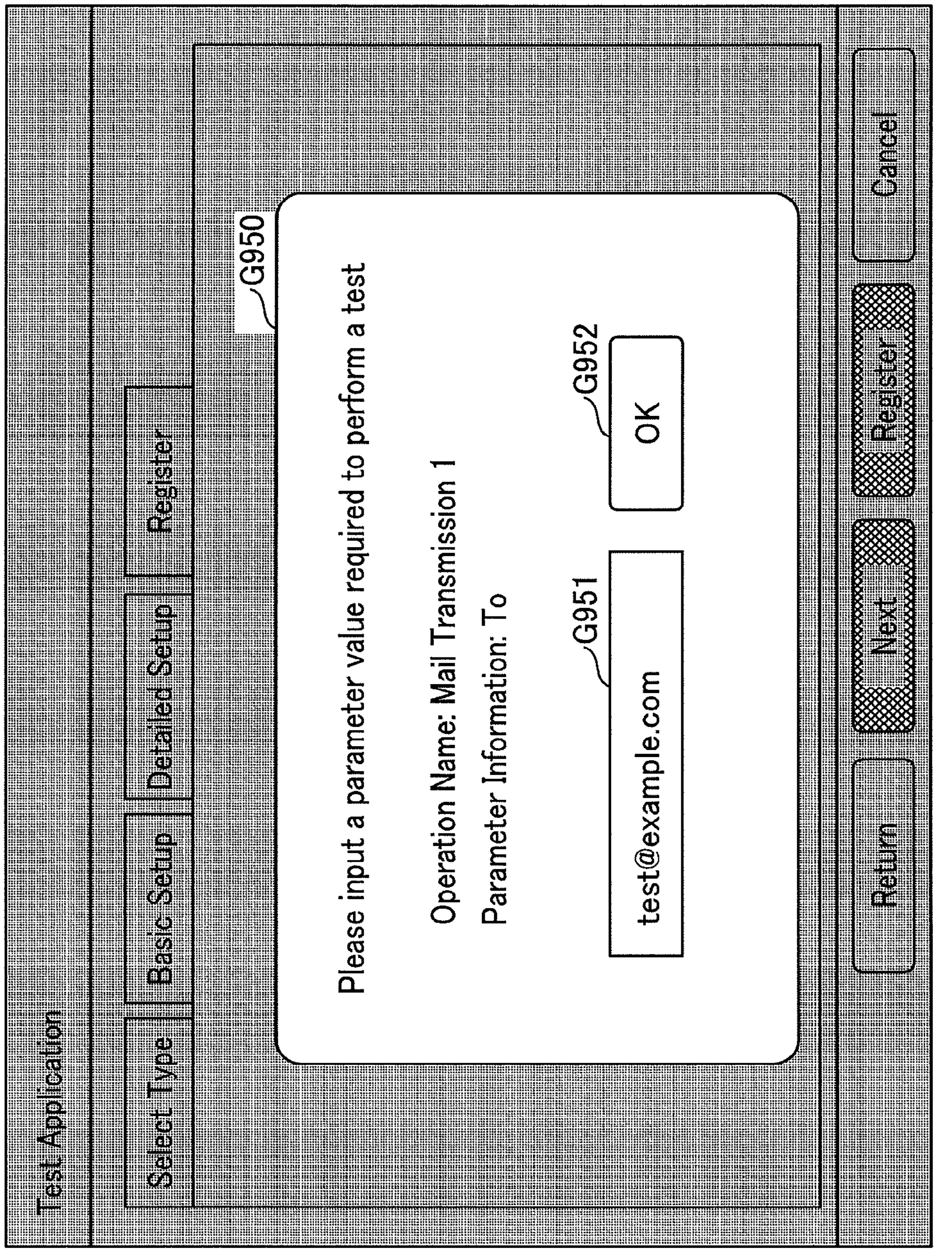
FIG. 23 is an illustration of an example of a parameter input screen.

The browser 310 displays a parameter input screen used by the user to input a parameter value for a piece of the parameter information (S2208). An example of a parameter input screen G950 is illustrated in FIG. 23. FIG. 23 is an illustration of the example of the parameter input screen G950.

The parameter input screen G950 illustrated in FIG. 23 is a screen for inputting a parameter value of a piece of the parameter information of "To" used for the processing of an operation name of "mail transmission 1". The user designates a parameter value of the piece of the parameter information by inputting the parameter value in a parameter input filed G951 and pressing an OK button G952.

Subsequently, the browser 310 updates the parameter value for the parameter information defined in the processing flow information 1100 with the parameter value designated by the user on the parameter input screen G950 displayed in S2208 described above (S2209). Through this, the parameter value for the piece of the parameter information defined in the processing flow information 1100 is set with the parameter value input by the user.

Through the process from S2207 to S2209, regarding the parameter information for which the parameter value is required to be input by the user, which is defined in the processing flow information 1100, the parameter value is input by the user.

The browser 310 generates test cases by combining the pieces of parameter information from the application screen information 2000, the application configuration information 1200, and the processing flow information 1100 by using, for example, all pair method (pair wise method) (S2210).

As described above, with the information processing system 1 according to the present embodiment, the user inputs the parameter value for the piece of the parameter information in testing the processing flow of the application. This prevents improper termination of the processing flow, which is caused by not designating the parameter value.

Figure 24:
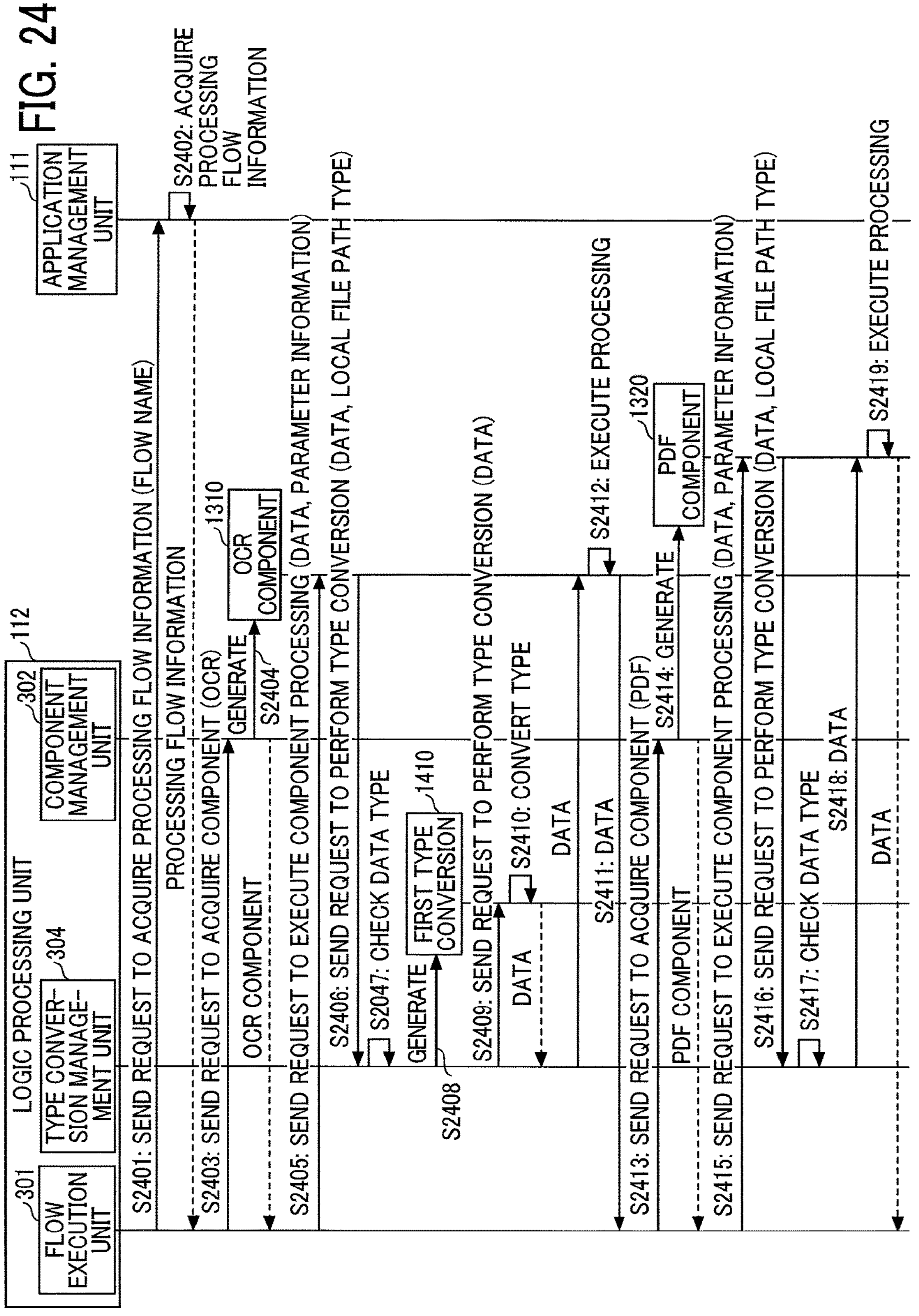
FIG. 24 is a sequence diagram illustrating an example of a process of executing a processing flow for providing an optical character recognition (OCR) division service.

A detailed description is given below of the process of S1808 of FIG. 18 (process of executing the processing flow) with reference to FIG. 24. FIG. 24 is a sequence diagram illustrating an example of the process of executing the processing flow for providing the OCR division service.

Upon receiving the application execution request from the application execution unit 122, the flow execution unit 301 sends a request for processing flow information (acquisition request) to the application management unit 111 (S2401). The acquisition request includes the flow name of "ocr-divide".

Upon receiving the request for the processing flow information, the application management unit 111 acquires the processing flow information 1100 of the flow name of "ocr-divide", which is included in the acquisition request, from the application information storage unit 150 (S2402). Then, the application management unit 111 sends the processing flow information 1100 acquired from the application information storage unit 150 to the flow execution unit 301.

Here, in the following description, the application management unit 111 sends the processing flow information 1100 as illustrated in FIG. 7 to the flow execution unit 301, for example.

The flow execution unit 301, subsequently, sends to the component management unit 302, a request for a component (component acquisition request) based on the processing flow information 1100 (S2403).

That is, the flow execution unit 301 sends, to the component management unit 302, the component acquisition request for a component having a component name of "OCR", which is defined as "component" included in the detailed processing definition 1110 of the process flow information 1100 illustrated in FIG. 7.

Upon receiving the component acquisition request, the component management unit 302 generates a component having the component name of "OCR" (namely, OCR component 1310) (S2404). The OCR component 1310 may be generated by using the API for generating a component that is defined in the component common I/F 1300.

The component management unit 302 sends the generated OCR component 1310 to the flow execution unit 301. That is, the component management unit 302 sends, to the flow execution unit 301, an address on a memory such as the RAM 14, to which the OCR component 1310 is expanded.

Then, the flow execution unit 301 sends, to the OCR component 1310, a request to execute the component (execution request) (S2405). The execution request includes data and parameter information.

The data is an electronic file included in the application execution request, which is received in a data type of "InputStream". That is, the flow execution unit 301 passes the electronic file to the OCR component 1310 as simple "data" (without regarding a data type), and request to execute the processing. In the present embodiment, various types of information such as an electronic file of which a data type is not regarded is simply referred to as "data". The parameter information is information on parameters included in the application execution request.

Upon receiving the request to execute the component, the OCR component 1310 sends a request to perform type conversion (type conversion request) to the type conversion management unit 304 (S2406). The type conversion request includes the data and a designation of "LocalFilePath" indicating a data type for which the OCR component 1310 supports.

Upon receiving the type conversion request, the type conversion management unit 304 checks whether or not the data type of the data included in the type conversion request matches the data type designated (S2407).

In this example, the data type of the data included in the type conversion request is "InputStream", while the designated data type is "LocalFilePath". Accordingly, the type conversion management unit 304 determines that the data type of the data included in the type conversion request does not match the designated data type.

Then, the type conversion management unit 304 refers to the type conversion information table 4000 and specifies type conversion for converting the data type "InputStream" to "LocalFilePath" (here, the first type conversion 1410 is specified). Subsequently, the type conversion management unit 304 generates the specified first type conversion 1410 (S2408). The first type conversion 1410 may be generated by using the type conversion common I/F 1400.

Subsequently, the type conversion management unit 304 sends a request to execute the type conversion to the first type conversion 1410 (S2409). The execution request includes data.

Upon receiving the request to execute the type conversion, the first type conversion 1410 performs type conversion to convert the data type of the data included in the execution request from "InputStream" to "LocalFilePath" (S2410). Then, the first type conversion 1410 sends, to the type conversion management unit 304, the data of which the data type is converted.

Upon receiving the data from the first type conversion 1410, the type conversion management unit 304 sends the data to the OCR component 1310 (S2411).

Upon receiving the data from the type conversion management unit 304, the OCR component 1310 execute the processing on the data using the parameter information (S2412).

When the application execution request includes parameter information of "language":English", for example, the OCR component 1310 causes the OCR processing unit 131 to perform the OCR processing on the electronic file indicated with the data by the parameter information.

The OCR component 1310, subsequently, sends the electronic file on which the OCR processing is performed (namely, a PDF file including texts) to the flow execution unit 301.

The flow execution unit 301, subsequently, sends to the component management unit 302, a request for a component (component acquisition request) based on the processing flow information 1100 (S2413).

That is, the flow execution unit 301 sends, to the component management unit 302, the component acquisition request for a component having a component name of "PDF", which is defined as "component" included in the detailed processing definition 1120 of the processing flow information 1100 illustrated in FIG. 7.

Upon receiving the component acquisition request, the component management unit 302 generates the component having the component name of "PDF" (namely, PDF component 1320) (S2414). The PDF component 1320 may be generated by using the API for generating a component that is defined in the component common I/F 1300.

The component management unit 302 sends the generated PDF component 1320 to the flow execution unit 301. That is, the component management unit 302 sends, to the flow execution unit 301, an address on the memory such as the RAM 14, to which the PDF component 1320 is expanded, for example.

Then, the flow execution unit 301 sends, to the PDF component 1320, a request to execute the component (execution request) (S2415). The execution request includes data and parameter information.

The data is data that is sent from the OCR component 1310 (namely, a path indicating the electronic file (PDF file including texts), on which the OCR processing is performed).

Upon receiving the request to execute the component, the PDF component 1320 sends a request to perform type conversion (type conversion request) to the type conversion management unit 304 (S2416). The type conversion request includes the data and a designation of "LocalFilePath" indicating a data type for which the PDF component 1320 supports.

Upon receiving the type conversion request, the type conversion management unit 304 checks whether the data type of the data included in the type conversion request matches the data type designated (S2417).

In this example, the designated data type and the data type of the data included in the type conversion request are both "LocalFilePath". Accordingly, the type conversion management unit 304 determines that the data type of the data included in the type conversion request matches the designated data type.

The type conversion management unit 304 sends the data included in the type conversion request to the PDF component 1320 (S2418). As described above, when a result of the check of the data type in S2417 indicates that the data type of the data included in the execution request matches the designated data type, the type conversion management unit 304 does not generate a type conversion.

Upon receiving the data from the type conversion management unit 304, the PDF component 1320 executes the processing on the data using the parameter information (S2419).

The application execution request includes the pieces of parameter information of "divisionPageRange":"Each Pages" and "divisionPageNumbers":100", for example. In this case, the PDF component 1320 divides the electronic file (PDF including texts) represented by the data using the parameter information. More specifically, in this case, the PDF component 1320 divides each page being after the page number of "100" to generate a PDF file including the texts.

Then, the PDF component 1320 sends the data representing the electronic file, which is divided, to the flow execution unit 301.

Thus, execution of the series of processes (processing flow) based on the processing flow information 1100 illustrated in FIG. 7 is completed. Accordingly, the service provision system 10, according to the present embodiment, tests, for each test case, the processing flow providing the service (OCR division service), which is provided by the OCR division application. As described later, the OCR division service is provided to the apparatus 20.

Figure 25:
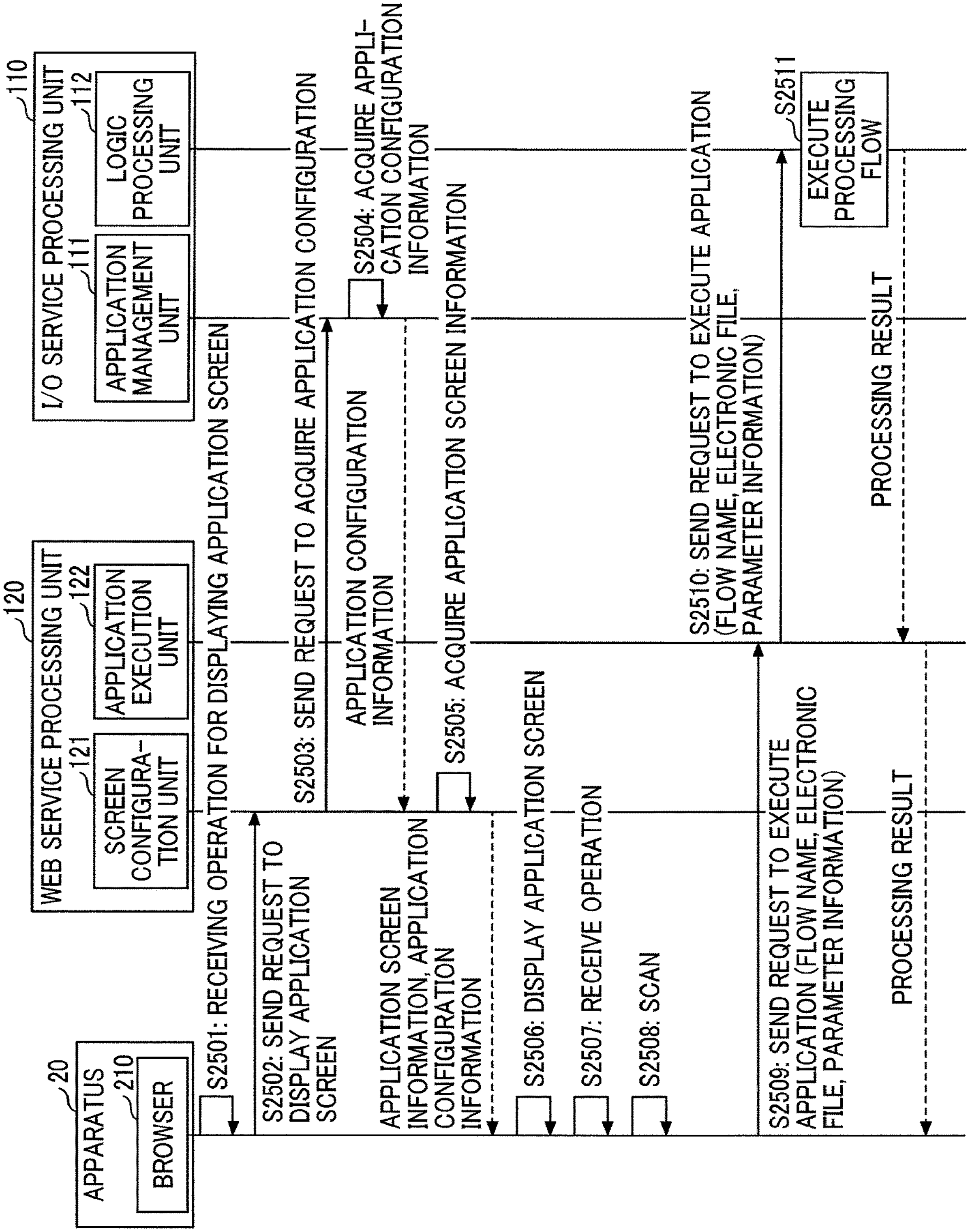
FIG. 25 is a sequence diagram illustrating an example of the entire process of using the OCR division service.

A description is given below of a process in which the user of the apparatus 20 uses the OCR division service with reference to FIG. 25. FIG. 25 is a sequence diagram illustrating an example of the entire process of using the OCR division service.

The browser 210 of the apparatus 20 receives operation for displaying an application screen of the OCR division service (display operation) (S2501). The user of the apparatus 20 performs the display operation for displaying the application screen by inputting a URL of the application screen of the OCR division service to an address bar of the browser 210, for example.

Upon receiving the display operation for displaying the application screen of the OCR division service, the browser 210 of the apparatus 20 sends a request to display the application screen (display request) to the screen configuration unit 121 of the web service processing unit 120 (S2502). The display request of the application screen of the OCR division service includes an application ID of the application information 1000 that provides the OCR division service.

The screen configuration unit 121 of the web service processing unit 120 sends a request for application configuration (acquisition request) to the application management unit 111 of the I/O service processing unit 110 in response to the request for the display request (S2503). The acquisition request for the application configuration includes the application ID of the application information 1000, which provides the OCR division service.

Upon receiving the acquisition request, the application management unit 111 of the I/O service processing unit 110 acquires the application configuration information 1200 stored in association with the application ID included in the acquisition request, from the application information storage unit 150 (S2504). The application management unit 111, then, sends the application configuration information 1200 acquired from the application information storage unit 150 to the screen configuration unit 121.

Subsequently, the screen configuration unit 121 of the web service processing unit 120 acquires, from the application screen information storage unit 160, the application screen information 2000 that is stored in association with the application ID of the application information 1000 providing the OCR division service (S2505). The screen configuration unit 121 sends, to the browser 210, the application screen information 2000 acquired from the application screen information storage unit 160 and the application configuration information 1200 received in S2504, which is described above.

Figure 26:
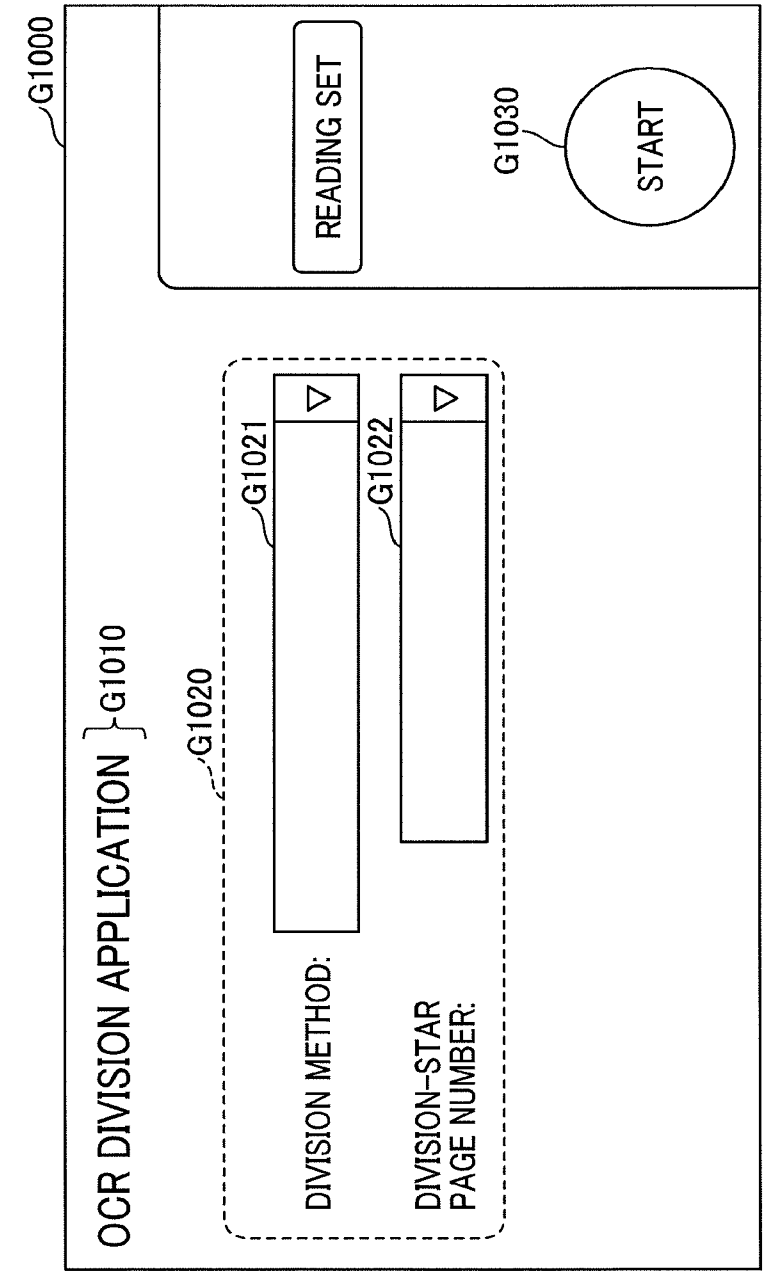
FIG. 26 is an illustration of an example of an application screen of an OCR division application.

The browser 210 of the apparatus 20 displays an application screen G1000 illustrated in FIG. 26, for example, based on the application screen information 2000 and the application configuration information 1200 received from the screen configuration unit 121 (S2506).

Here, the application screen G1000 illustrated in FIG. 26 is a screen that enables the user of the apparatus 20 to use the OCR division service.

The application screen G1000 illustrated in FIG. 26 includes an application name G1010, a parameter value input area G1020, and a "START" button G1030. The parameter value input area G1020 includes a division method input field G 1021 and a division-start page number input field G1022.

The application name G1010 is displayed based on the application display name 1203 in the application configuration information 1200 illustrated in FIG. 15. When the application display name 1203 defines an application title with more than one languages, the application title with a language that is set in the browser 210 is displayed as the application name G1010.

The division method input field G1021 and the division-start page number input field G1022 are displayed based on the user input parameter 1208 in the application configuration information 1200 illustrated in FIG. 15.

Namely, the division method input field G 1021 is displayed based on the input definition 1210 of the user input parameter 1208. Similarly, the division-start page number input field G1022 is displayed based on the input definition 1220 of the user input parameter 1208.

As described above, the application screen, which is used by the user of the apparatus 20 to use the service, displays the application name and the parameter value input area based on the information defined in the application configuration information 1200.

Here, in the description, with the application screen G1000 illustrated in FIG. 26, the user inputs and/or select the parameter values in/with the division method input field G1021 and the division-start page number input field G1022, respectively, and then performs operation of pressing the "START" button G1030, namely operation for execution.

The browser 210 of the apparatus 20, then, receives the operation for execution (S2507). Subsequently, the browser 210 of the apparatus 20 causes the scanner 26 to read a document to generate an electronic file (image file) (S2508).

When the electronic file (image file) is generated, the browser 210 of the apparatus 20 sends an application execution request to the application execution unit 122 of the Web service processing unit 120 (S2509). The application execution request includes the flow name of "ocr-divide", which is defined with the flow name 1205 of the application configuration information 1200, the electronic file generated in S2508 described above, and the parameter information.

The parameter information includes the piece(s) of the parameter information defined in the default parameters 1207 of the application configuration information 1200 and the piece(s) of the parameter information having the parameter value(s) input by the user on the application screen G1000.

Upon receiving the application execution request, the application execution unit 122 of the web service processing unit 120 sends the execution request to the logic processing unit 112 of the I/O service processing unit 110 (S2510).

Upon receiving the application execution request, the logic processing unit 112 of the I/O service processing unit 110 executes the processing flow (S2511) Namely, the logic processing unit 112 executes the processing flow described above with reference to FIG. 24.

Subsequently, the logic processing unit 112 sends a processing result obtained by executing the processing flow to the browser 210 via the web service processing unit 120. This enables the service provision system 10 according to the present embodiment to provide the service.

Figure 27:
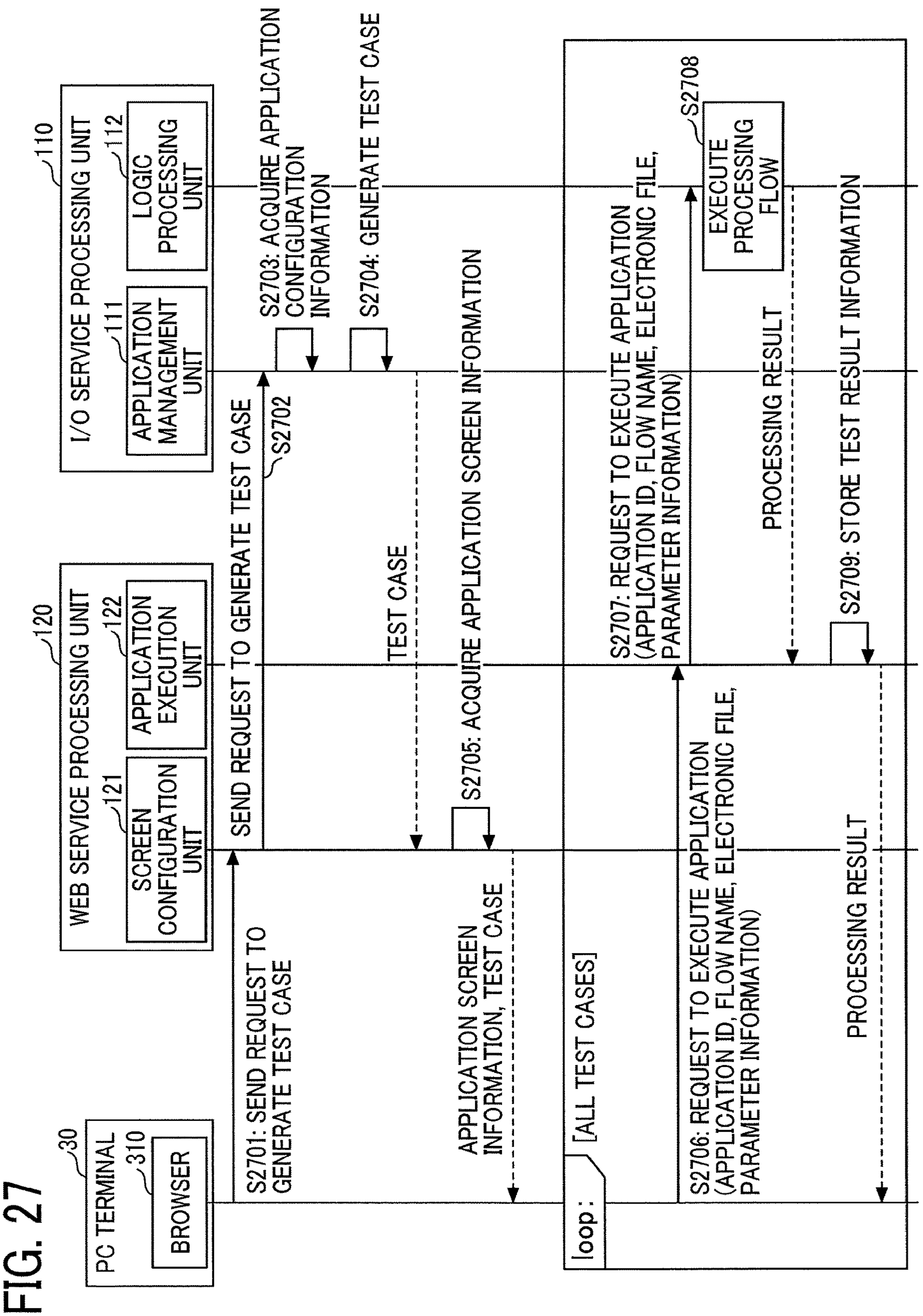
FIG. 27 is a sequence diagram illustrating another example of the process of performing a test, according to the first embodiment.

Here, in the process of performing a test described above with reference to FIG. 18, the test cases are generated by the browser 310, but the present embodiment is not limited to this. The test cases may be generated by the service provision system 10, for example. A description is given below of a process of performing a test in which test cases are generated by the service provision system 10 with reference to FIG. 27. FIG. 27 is a sequence diagram illustrating another example of the process of performing a test according to the present embodiment. The process of S2706 to S2709 of FIG. 27 is substantially the same as the process of S1806 to S1809 of FIG. 18, and the description corresponding to the process of S2706 to S2709 of FIG. 27 is omitted.

Upon receiving the operation for performing a test, the browser 310 sends a request to generate test cases to the screen configuration unit 121 of the web service processing unit 120 (S2701). The request to generate test cases includes an application ID sent from the application management unit 111 in S813 of FIG. 8.

Upon receiving request to generate test cases, the screen configuration unit 121 of the web service processing unit 120 sends the request to the application management unit 111 of the I/O service processing unit 110 (S2702).

Upon receiving the request generate test cases, the application management unit 111 of the I/O service processing unit 110 acquires the application configuration information 1200 stored in association with the application ID included in the request, from the application information storage unit 150 (S2703).

Upon receiving the request to generate test cases, the application management unit 111 of the I/O service processing unit 110 generates test cases based on the application configuration information 1200 acquired in S2703 described above. (S2704). The method of generating the test cases is the same as that of S1805 of FIG. 8.

Then, the application management unit 111 sends the generated test cases to the screen configuration unit 121 of the Web service processing unit 120.

Upon receiving the test cases, the screen configuration unit 121 of the web service processing unit 120 acquires the application screen information 2000 for displaying the test result screen G800 and the test result screen G900 from the application screen information storage unit 160 (S2705). The screen configuration unit 121 sends, to the browser 310, the application screen information 2000 acquired from the application screen information storage unit 160 and the test cases received in S2704, which is described above.

As described above, in the information processing system 1 according to the present embodiment, the test cases may be generated by the service provision system 10 and sent to the browser 310.

Second Embodiment

A second embodiment is described below. In the second embodiment, a case where test cases are generated based on information associated with each component (hereinafter, the information may be referred to as "component information"). For example, when a default parameter value is defined in the component information, each test case is generated by considering the default parameter value.

In the following description of the second embodiment, differences from the first embodiment are mainly described, and description of components which are substantially the same as those in the first embodiment is appropriately omitted.

<Functional Configuration>

Figure 28:
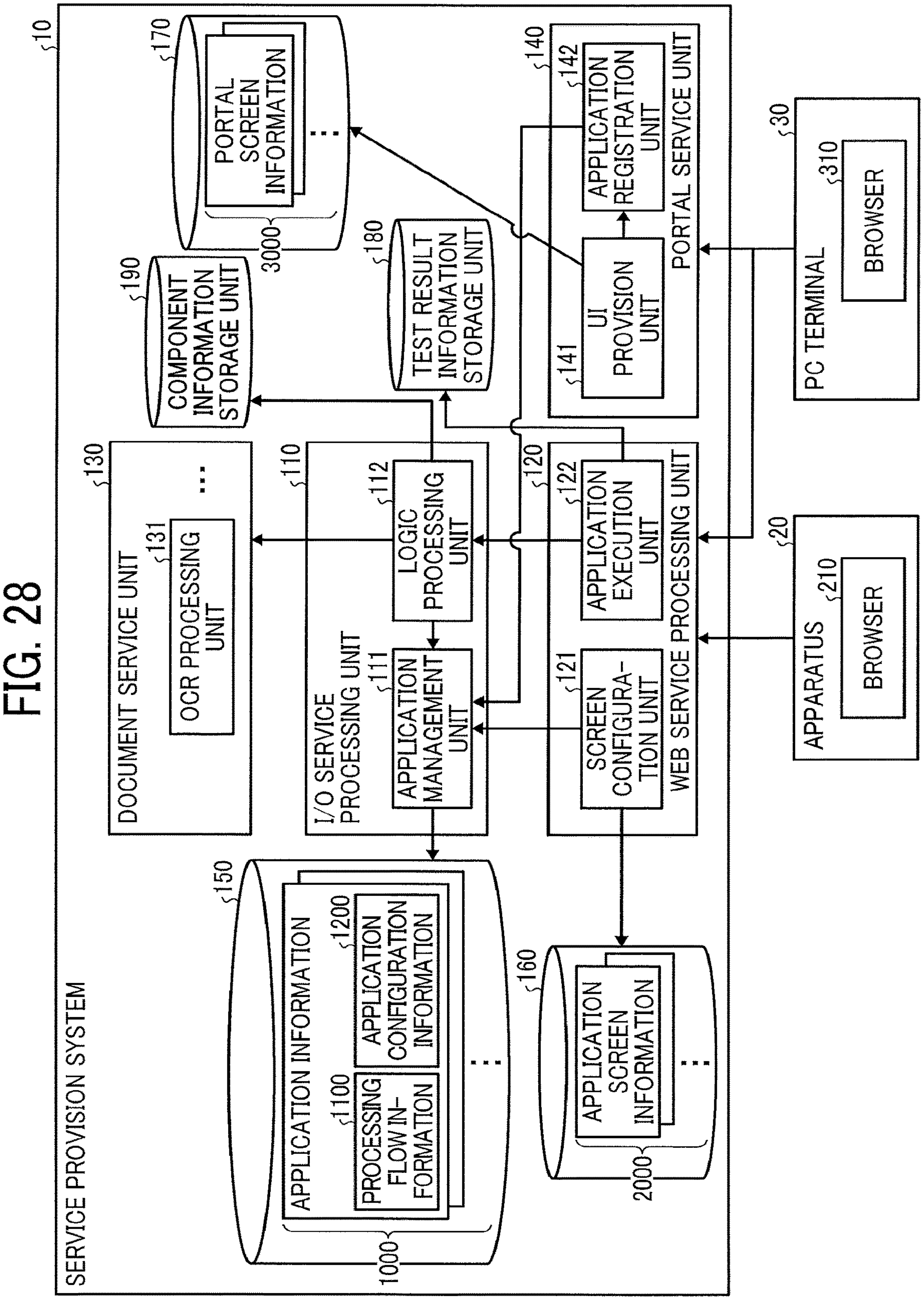
FIG. 28 is a diagram illustrating an example of a functional configuration of an information processing system according to a second embodiment.

A description is given below of a functional configuration of the information processing system 1 according to the present embodiment with reference to FIG. 28. FIG. 28 is a diagram illustrating an example of a functional configuration of an information processing system 1 according to the present embodiment.

A service provision system 10 illustrated in FIG. 28 further includes a component information storage unit 190. The storage unit may be implemented with the HDD 18. Alternatively, the storage unit may be implemented with a storage device connected to the service provision system 10 through a network.

The component information storage unit 190 stores component information 1500. In the component information 1500, various types of information on components (for example, operations that are executable with the components, parameter information used for executing the operations, etc.) are defined.

<Process>

Figure 29:
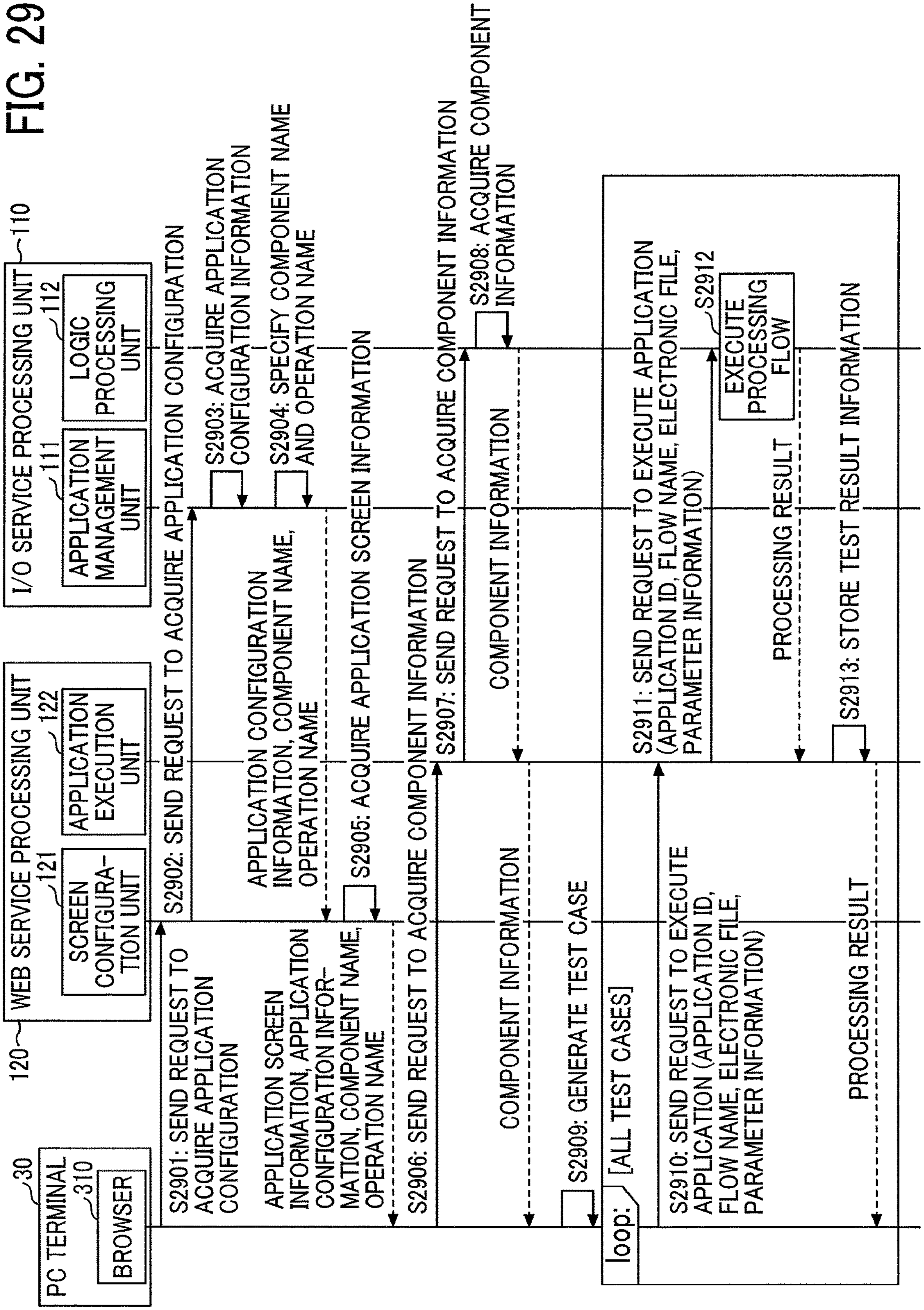
FIG. 29 is a sequence diagram illustrating an example of a process of performing a test, according to the second embodiment.

A detailed description is given below of processes performed by the information processing system 1 according to the present embodiment. A detailed description is given below of the process of performing a test, according to the present embodiment with reference to FIG. 29. FIG. 29 is a sequence diagram illustrating an example of the process of performing a test, according to the embodiment. The process from S2910 to S2913 of FIG. 29 is substantially the same as the process from S1806 to S1809 of FIG. 18, and the description corresponding to the process from S2910 to S2913 of FIG. 29 is omitted here.

Upon receiving an operation for performing a test, the browser 310 sends a request to acquire an application configuration (application configuration acquisition request) to the screen configuration unit 121 of the web service processing unit 120 (S2901). The application configuration acquisition request includes the application ID received from the application management unit 111 in S813 of FIG. 8 described above.

Upon receiving the application configuration acquisition request, the screen configuration unit 121 of the web service processing unit 120 sends the acquisition request to the application management unit 111 of the I/O service processing unit 110 (S2902).

Upon receiving the acquisition request for the application configuration, the application management unit 111 of the I/O service processing unit 110 acquires the application configuration information 1200 stored in association with the application ID included in the acquisition request, from the application information storage unit 150 (S2903).

Here, in the following description, the application configuration information 1200 of FIG. 30 is acquired in S2903, for example. In the application configuration information 1200 illustrated in FIG. 30, the input definition 1210 in the user input parameters 1208 is different from that in FIG. 15. That is, the parameter information of "divisionPageRange" in the input definition 1210 of the application configuration information 1200 illustrated in FIG. 30, defines "text" as "inputType".

Subsequently, the application management unit 111 of the I/O service processing unit 110 specifies a component name and an operation name from the processing flow information 1100 corresponding to the flow name 1205 of the application configuration information 1200 acquired in S2903 described above (S2904).

Here, in the description, for example, "ocr-divide" is defined as the flow name 1205 in the application configuration information 1200 acquired in S2903 described above. In this example, the application management unit 111 specifies a component name of "OCR" and an operation name of "process" from the detailed process definition 1110 of the processing flow information 1100 illustrated in FIG. 7. Similarly, the application management unit 111 specifies a component name of "PDF" and an operation name of "divideByPageNumbers" from the detailed process definition 1120 of the processing flow information 1100 illustrated in FIG. 7.

Then, the application management unit 111 sends the application configuration information 1200 acquired in S2903 described above and the component name and the operation name specified in S2904 to the screen configuration unit 121 of the web service processing unit 120.

The screen configuration unit 121 of the web service processing unit 120 acquires the application screen information 2000 for displaying the test result screen G800 and the test result screen G900 from the application screen information storage unit 160 (S2905). The screen configuration unit 121 sends, to the browser 310, the application screen information 2000 acquired from the application screen information storage unit 160 and the application configuration information 1200 received in S2904 described above.

When the application screen information 2000, the application configuration information 1200, the component name and the operation name are received, the browser 310 sends a request for component information (acquisition request) to the application execution unit 122 of the web service processing unit 120 (S2906). The component information acquisition request includes the component name received from the screen configuration unit 121.

Upon receiving the component information acquisition request, the application execution unit 122 of the Web service processing unit 120 sends the acquisition request to the logic processing unit 112 of the I/O service processing unit 110 (S2907).

Upon receiving the component information acquisition request, the logic processing unit 112 of the I/O service processing unit 110 acquires at least one piece of the component information 1500 of the component name included in the acquisition request, from the component information storage unit 190 (S2908).

For example, here, in the description, the component information acquisition request includes component names of "OCR" and "PDF". In this example, the logic processing unit 112 acquires a piece of the component information 1500 of the component name of "OCR" and a piece of the component information 1500 of the component name of "PDF".

An example of the piece of the component information 1500 of the component name of "OCR" is illustrated in FIG. 31. The component information 1500 illustrated in FIG. 31 includes a component name 1501, an operation name 1502, and a parameter definition 1503.

In the parameter definition 1503, "name" indicating a parameter name, "defaultValue" indicating a default parameter value, and "optionValues" indicating settable parameter value are defined.

Then, the logic processing unit 112 sends the acquired component information 1500 to the browser 310 via the application execution unit 122.

Upon receiving the component information 1500, the browser 310 generates test cases by combining the pieces of the parameter information based on the application configuration information 1200, the component information 1500, and the operation name (S2909).

For example, in the piece of the parameter information of "divisionPageRange" in the input definition 1210 of the application configuration information 1200 illustrated in FIG. 30, "text" is defined as "inputType". Accordingly, the parameter value for the piece of the parameter information of "divisionPageRange" is not clear.

Therefore, in this example, the browser 310 generates the test cases using a default parameter of "Each Pages" defined in the parameter definition 1503 of the component information 1500 illustrated in FIG. 31.

As described above, when a suitable parameter value is not defined in the application configuration information 1200, the browser 310 uses a default parameter defined in the component information 1500 to generate the test cases. Accordingly, in the information processing system 1 according to the present embodiment, the application in which the default parameter value defined in the component information 1500 is used for executing the processing flow is tested with the default parameter value.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), DSP (digital signal processor), FPGA (field programmable gate array) and conventional circuit components arranged to perform the recited functions.

Although the embodiments of the disclosure have been described and illustrated above, such description is not intended to limit the disclosure to the illustrated embodiments. Numerous additional modifications and variations are possible in light of the above teachings. It is therefore to be understood that within the scope of the appended claims, the embodiments may be practiced otherwise than as specifically described herein. For example, elements and/or features of different illustrative embodiments may be combined with each other and/or substituted for each other within the scope of this disclosure and appended claims.

What is claimed is:

1. An information processing system including one or more information processing apparatuses each of which is configured to perform a plurality of programs to implement functions, the information processing system comprising:

the one or more information processing apparatuses which form a service provision system;

a terminal device; and at least one electronic apparatus, wherein the service provision system includes a memory configured to store application information associating flow information and application configuration information for each of one or more applications that performs, when executed, a series of processes using electronic data which utilize at least one function of the at least one electronic apparatus, wherein, the flow information defines program identification information identifying each of one or more programs, which is executed to perform a process included in the series of processes, and an order of executing the one or more programs, wherein, the application configuration information defines parameter information used to execute each of the one or more programs, and flow identification information identifying the corresponding flow information; and circuitry configured to receive, from the terminal device, a registration request including the application configuration information generated by the terminal device, generate one or more test cases used to test the series of processes based on the parameter information defined in the application configuration information included in the registration request received, the application configuration information including the parameter information set from the terminal device, the set parameter information including a parameter condition that can be set from the at least one electronic apparatus using the application, wherein each test case indicates a combination of pieces of the parameter information, acquire the flow information identified with the flow identification information defined in the application configuration information included in the registration request, and execute, according to the order of executing the one or more programs defined in the flow information, the one or more programs each of which is identified with the program identification information defined in the flow information acquired, to test the series of processes, wherein each program is executed using the combination of the pieces of the parameter information indicated with each test case generated.

2. The information processing system of claim 1, wherein the circuitry causes the memory to store the application configuration information received, in association with the flow information identified with the flow identification information identified in the application configuration information, and generates each test case based on the parameter information defined in the application configuration information registered.

3. The information processing system of claim 1, wherein the circuitry causes the memory to store the application configuration information received, in association with the flow information identified with the flow identification information defined in the application configuration information, when the test case is successfully performed.

4. The information processing system of claim 1, wherein the circuitry generates each test case, based on the parameter information defined in the application configuration information and information indicating a range of settable parameter value for each pieces of the parameter information in a manner that the test case includes the pieces of the parameter information for each of which a boundary value of the range is set as a parameter value.

5. The information processing system of claim 1, wherein the circuitry generates each test case, based on the parameter information defined in the application configuration information and the parameter information defined in the flow information identified with the flow identification information identified in the application configuration information.

6. The information processing system of claim 1, wherein the circuitry generates each test case, based on the parameter information for which a parameter value is set according to a user input, and at least one of the parameter information defined in the application configuration information and the parameter information defined in the flow information identified with the flow identification information identified in the application configuration information.

7. The information processing system of claim 1, wherein the circuitry specifies the program identification information defined in the application configuration information included in the registration request received, and generates each test case, based on the parameter information defined in the application configuration information and the parameter information defined in information associated with the program identified with the program identification information specified.

8. The information processing system of claim 1, wherein each program is executed using an electronic file in addition to the combination of the pieces of the parameter information.

9. The information processing system of claim 8, wherein the electronic file is a dummy electronic file.

10. An information processing apparatus, which performs a plurality of programs to implement functions and being configured to operate in a system with a terminal device and at least one electronic apparatus, comprising:

a memory configured to store application information associating flow information and application configuration information for each of one or more applications that performs, when executed, a series of processes using electronic data which utilize at least one function of the at least one electronic apparatus, wherein, the flow information defines program identification information identifying each of one or more programs, which is executed for a process included in the series of processes, and an order of executing the one or more programs, wherein, the parameter information is used to execute each of the one or more programs; and circuitry configured to receive, from the terminal device, a registration request including the application configuration information generated by the terminal device, generate one or more test cases used to test the series of processes based on the parameter information defined in the application configuration information included in the registration request received, the application configuration information including the parameter information set from the terminal device, the set parameter information including a parameter condition that can be set from the at least one electronic apparatus using the application, wherein each test case indicates a combination of pieces of the parameter information, acquire the flow information identified with the flow identification information defined in the application configuration information included in the registration request, and execute, according to the order of executing the one or more programs defined in the flow information, the one or more programs each of which is identified with the program identification information defined in the flow information acquired, to test the series of processes, wherein each program is executed using the combination of the pieces of the parameter information indicated with each test case generated.

11. An information processing method, implemented by an information processing apparatus which performs a plurality of programs to implement functions and being configured to operate in a system with a terminal device and at least one electronic apparatus, comprising:

storing, in a memory, application information associating flow information and application configuration information for each of one or more applications that performs, when executed, a series of processes using electronic data which utilize at least one function of the at least one electronic apparatus, wherein, the flow information defines program identification information identifying each of one or more programs, which is executed to perform a process included in the series of processes, and an order of executing the one or more programs, wherein, the application configuration information defines parameter information used to execute each of the one or more programs, and flow identification information identifying the corresponding flow information;

receiving, from the terminal device, a registration request including application configuration information generated by the terminal device, generating one or more test cases used to test the series of processes based on the parameter information defined in the application configuration information included in the registration request received, the application configuration information including the parameter information set from the terminal device, the set parameter information including a parameter condition that can be set from the at least one electronic apparatus using the application, wherein each test case indicates a combination of pieces of the parameter information;

acquiring the flow information identified with the flow identification information defined in the application configuration information included in the registration request; and executing according to the order of executing the one or more programs defined in the flow information, the one or more programs each of which is identified with the program identification information defined in the flow information acquired, to test the series of processes, wherein each program is executed using the combination of the pieces of the parameter information indicated with each test case generated.

* * * * *